United States Patent
Johnson et al.

(10) Patent No.: US 9,410,644 B2
(45) Date of Patent: Aug. 9, 2016

(54) SUBSEA PIPE SECTION WITH REINFORCEMENT LAYER

(71) Applicant: Ticona LLC, Florence, KY (US)

(72) Inventors: Aaron Johnson, Winona, MN (US); David Eastep, Winona, MN (US); Timothy Tibor, Winona, MN (US)

(73) Assignee: Ticona LLC, Florence, KY (US)

(*) Notice: Subject to any disclaimer, the term of this patent is extended or adjusted under 35 U.S.C. 154(b) by 434 days.

(21) Appl. No.: 13/917,046

(22) Filed: Jun. 13, 2013

(65) Prior Publication Data

US 2013/0333788 A1    Dec. 19, 2013

Related U.S. Application Data

(60) Provisional application No. 61/660,288, filed on Jun. 15, 2012.

(51) Int. Cl.
| | | |
|---|---|---|
| *F16L 9/00* | (2006.01) | |
| *B29C 70/86* | (2006.01) | |
| *B29L 23/00* | (2006.01) | |

(52) U.S. Cl.
CPC . *F16L 9/00* (2013.01); *B29C 70/86* (2013.01); *B29L 2023/00* (2013.01); *Y10T 156/10* (2015.01)

(58) Field of Classification Search
CPC ....... F16L 9/12; F16L 9/133; Y10T 428/1393
USPC ................. 138/144, 141, 153, 124, 129, 172; 428/36.91
See application file for complete search history.

(56) References Cited

U.S. PATENT DOCUMENTS

| | | | |
|---|---|---|---|
| 1,078,448 A | 11/1913 | Marcroft | |
| 1,111,500 A | 9/1914 | Schautz et al. | |
| 1,898,085 A | 2/1933 | Dreyfus et al. | |
| 3,647,526 A | 3/1972 | Barnes | |
| 3,803,965 A | 4/1974 | Alderfer | |
| 3,934,064 A * | 1/1976 | Lowthian | B29C 51/145 138/124 |
| 4,531,959 A | 7/1985 | Gitimoy et al. | |
| 4,588,538 A | 5/1986 | Chung et al. | |
| 4,643,126 A | 2/1987 | Wilkinson et al. | |
| 4,720,366 A | 1/1988 | Binnersley et al. | |
| 4,721,637 A * | 1/1988 | Suzuki | B29C 47/0004 138/172 |
| 4,728,387 A | 3/1988 | Hilakos | |
| RE32,772 E | 10/1988 | Hawley | |

(Continued)

FOREIGN PATENT DOCUMENTS

| | | |
|---|---|---|
| DE | 19827524 A1 | 12/1999 |
| EP | 0320653 A2 | 11/1988 |

(Continued)

*Primary Examiner* — Patrick F Brinson
(74) *Attorney, Agent, or Firm* — Dority & Manning, P.A.

(57) ABSTRACT

Subsea pipe sections and methods for forming subsea pipe sections are disclosed. A subsea pipe section includes a hollow body formed from a polymer material, the hollow body having an inner surface and an outer surface, the inner surface defining an interior. The subsea pipe section further includes a reinforcement layer surrounding and bonded to the hollow body, the reinforcement layer having an inner surface and an outer surface. The reinforcement layer is formed from a fiber reinforced thermoplastic material and has a resin rich portion and a fiber rich portion. The resin rich portion includes the inner surface of the reinforcement layer and is in contact with the hollow body. The fiber rich portion is spaced from the inner surface of the reinforcement layer.

27 Claims, 24 Drawing Sheets

(56) References Cited

U.S. PATENT DOCUMENTS

| | | | |
|---|---|---|---|
| 4,864,964 A | 9/1989 | Hilakos | |
| 4,883,625 A | 11/1989 | Glemet et al. | |
| 4,923,134 A | 5/1990 | Kinnan | |
| 4,957,422 A | 9/1990 | Glemet et al. | |
| 4,983,247 A | 1/1991 | Kim | |
| 4,997,703 A | 3/1991 | Gehrig | |
| 5,002,712 A | 3/1991 | Goldmann et al. | |
| 5,068,142 A | 11/1991 | Nose et al. | |
| 5,084,305 A | 1/1992 | Marttila | |
| 5,114,516 A | 5/1992 | Pilling et al. | |
| 5,114,633 A | 5/1992 | Stewart | |
| 5,116,450 A | 5/1992 | Spoo et al. | |
| 5,207,850 A | 5/1993 | Parekh | |
| 5,268,050 A | 12/1993 | Azari | |
| 5,277,566 A | 1/1994 | Augustin et al. | |
| 5,294,461 A | 3/1994 | Ishida | |
| 5,419,957 A | 5/1995 | Martin | |
| 5,529,652 A | 6/1996 | Asai et al. | |
| 5,783,129 A | 7/1998 | Shirai et al. | |
| 5,798,068 A | 8/1998 | Vlug | |
| 5,799,705 A * | 9/1998 | Friedrich | F16L 9/12 138/140 |
| 5,863,332 A | 1/1999 | Foster et al. | |
| 5,895,808 A | 4/1999 | Schmid et al. | |
| 5,935,508 A | 8/1999 | Fernyhough et al. | |
| 5,948,473 A | 9/1999 | Saito et al. | |
| 6,045,876 A | 4/2000 | Fellers et al. | |
| 6,048,598 A | 4/2000 | Bryan, III et al. | |
| 6,090,319 A | 7/2000 | Sharma et al. | |
| 6,117,591 A | 9/2000 | Takeuchi et al. | |
| 6,244,014 B1 | 6/2001 | Barmakian | |
| 6,248,262 B1 | 6/2001 | Kubotera et al. | |
| 6,258,453 B1 | 7/2001 | Montsinger | |
| 6,260,343 B1 | 7/2001 | Pourladian | |
| 6,270,851 B1 | 8/2001 | Lee et al. | |
| 6,286,558 B1 * | 9/2001 | Quigley | D04C 1/06 138/125 |
| 6,329,056 B1 | 12/2001 | Deve et al. | |
| 6,334,293 B1 | 1/2002 | Poethke et al. | |
| 6,344,270 B1 | 2/2002 | McCullough et al. | |
| 6,346,325 B1 | 2/2002 | Edwards et al. | |
| 6,391,959 B1 | 5/2002 | Ninomiya et al. | |
| 6,455,143 B1 | 9/2002 | Ishibashi et al. | |
| 6,517,654 B1 | 2/2003 | Heckel et al. | |
| 6,656,316 B1 | 12/2003 | Dyksterhouse | |
| 6,658,836 B2 | 12/2003 | Nguyen et al. | |
| 6,688,338 B2 * | 2/2004 | Meli | F16L 13/0272 138/123 |
| 6,846,857 B1 | 1/2005 | Lindner | |
| 6,872,343 B2 | 3/2005 | Edwards et al. | |
| 7,015,395 B2 | 3/2006 | Goldsworthy et al. | |
| 7,059,091 B2 | 6/2006 | Paulshus et al. | |
| 7,060,326 B2 | 6/2006 | Hiel et al. | |
| 7,093,416 B2 | 8/2006 | Johnson et al. | |
| 7,131,308 B2 | 11/2006 | McCullough et al. | |
| 7,179,522 B2 | 2/2007 | Hiel et al. | |
| 7,211,319 B2 | 5/2007 | Hiel et al. | |
| 7,220,492 B2 | 5/2007 | Fick et al. | |
| 7,291,263 B2 | 11/2007 | Ward et al. | |
| 7,326,854 B2 | 2/2008 | Varkey | |
| 7,368,162 B2 | 5/2008 | Hiel et al. | |
| 7,402,753 B2 | 7/2008 | Varkey et al. | |
| 7,438,971 B2 | 10/2008 | Bryant et al. | |
| 7,650,742 B2 | 1/2010 | Ushijima | |
| 7,705,242 B2 | 4/2010 | Winterhalter | |
| 7,754,966 B2 | 7/2010 | Figenschou | |
| 2001/0010248 A1 | 8/2001 | Vodermayer et al. | |
| 2002/0019182 A1 | 2/2002 | Ishibashi et al. | |
| 2002/0041049 A1 | 4/2002 | McCullough | |
| 2002/0125603 A1 | 9/2002 | Sakai et al. | |
| 2003/0037529 A1 | 2/2003 | Hanna et al. | |
| 2003/0082380 A1 | 5/2003 | Hager et al. | |
| 2003/0157280 A1 | 8/2003 | Boissonnat et al. | |
| 2004/0098963 A1 | 5/2004 | Calleeuw et al. | |
| 2004/0115422 A1 | 6/2004 | Levit et al. | |
| 2004/0182597 A1 | 9/2004 | Smith et al. | |
| 2004/0224590 A1 | 11/2004 | Rawa et al. | |
| 2004/0265558 A1 | 12/2004 | Berard | |
| 2005/0181228 A1 | 8/2005 | McCullough et al. | |
| 2005/0186410 A1 | 8/2005 | Bryant et al. | |
| 2005/0244231 A1 | 11/2005 | Liao et al. | |
| 2006/0021729 A1 | 2/2006 | Werner et al. | |
| 2006/0024489 A1 | 2/2006 | Werner et al. | |
| 2006/0024490 A1 | 2/2006 | Werner et al. | |
| 2006/0049541 A1 | 3/2006 | Sutton et al. | |
| 2006/0204739 A1 | 9/2006 | Papke et al. | |
| 2007/0128435 A1 | 6/2007 | Hiel et al. | |
| 2007/0193767 A1 | 8/2007 | Guery et al. | |
| 2007/0202331 A1 | 8/2007 | Davis et al. | |
| 2007/0269645 A1 | 11/2007 | Raghavendran et al. | |
| 2007/0271897 A1 | 11/2007 | Hanna et al. | |
| 2008/0006337 A1 | 1/2008 | Quigley et al. | |
| 2008/0141614 A1 | 6/2008 | Knouff et al. | |
| 2008/0250631 A1 | 10/2008 | Buckley | |
| 2008/0282664 A1 | 11/2008 | Chou | |
| 2008/0282666 A1 | 11/2008 | Chou | |
| 2009/0229452 A1 | 9/2009 | Milwich et al. | |
| 2010/0021718 A1 | 1/2010 | Vos et al. | |
| 2010/0038112 A1 | 2/2010 | Grether | |
| 2010/0163275 A1 | 7/2010 | Hiel et al. | |
| 2010/0181012 A1 | 7/2010 | Hiel et al. | |
| 2010/0206606 A1 | 8/2010 | Winterhalter | |
| 2010/0263761 A1 * | 10/2010 | Niccolls | B32B 1/08 138/146 |
| 2011/0097575 A1 | 4/2011 | Pratte et al. | |
| 2011/0284117 A1 * | 11/2011 | Ansell | F16L 11/085 138/140 |
| 2012/0273988 A1 | 11/2012 | Eastep et al. | |
| 2012/0321804 A1 | 12/2012 | Regan et al. | |
| 2013/0145986 A1 | 6/2013 | Regan | |
| 2013/0147082 A1 | 6/2013 | Johnson et al. | |
| 2013/0147083 A1 | 6/2013 | Eastep et al. | |
| 2013/0147084 A1 | 6/2013 | Johnson et al. | |
| 2013/0333780 A1 | 12/2013 | Chan | |
| 2014/0212650 A1 | 7/2014 | Johnson et al. | |

FOREIGN PATENT DOCUMENTS

| | | |
|---|---|---|
| EP | 0383290 A1 | 8/1990 |
| EP | 0415517 A1 | 3/1991 |
| EP | 0520347 A1 | 12/1992 |
| EP | 0707939 A2 | 4/1996 |
| EP | 0712716 A1 | 5/1996 |
| EP | 1291332 A2 | 3/2003 |
| EP | 1775092 A1 | 4/2007 |
| EP | 1790448 A1 | 5/2007 |
| FR | 2 836 591 A1 | 8/2003 |
| GB | 2240997 A | 8/1991 |
| JP | 58-138616 A | 8/1983 |
| JP | 03-119188 A | 5/1991 |
| JP | 05-033278 A | 7/1991 |
| JP | 05-148780 A | 11/1991 |
| JP | 05-050432 A | 3/1993 |
| JP | 06-071724 A | 3/1994 |
| JP | 07-279940 A | 10/1995 |
| JP | 11-348140 A | 12/1999 |
| JP | 2001-300935 A | 10/2001 |
| JP | 2004-300609 A | 10/2004 |
| WO | WO 99/57413 A1 | 11/1999 |
| WO | WO 99/67561 A1 | 12/1999 |
| WO | WO 2004/026565 A1 | 4/2004 |
| WO | WO 2004/080698 A1 | 9/2004 |
| WO | WO 2008/075964 A1 | 6/2008 |
| WO | WO 2009/130525 A1 | 10/2009 |
| WO | WO 2011/163349 A2 | 12/2011 |
| WO | WO2011/163357 | 12/2011 |
| WO | WO 2011/163357 A2 | 12/2011 |
| WO | WO 2011/163365 A2 | 12/2011 |
| WO | WO 2012/072993 A2 | 6/2012 |
| WO | WO 2012/149127 A1 | 11/2012 |

* cited by examiner

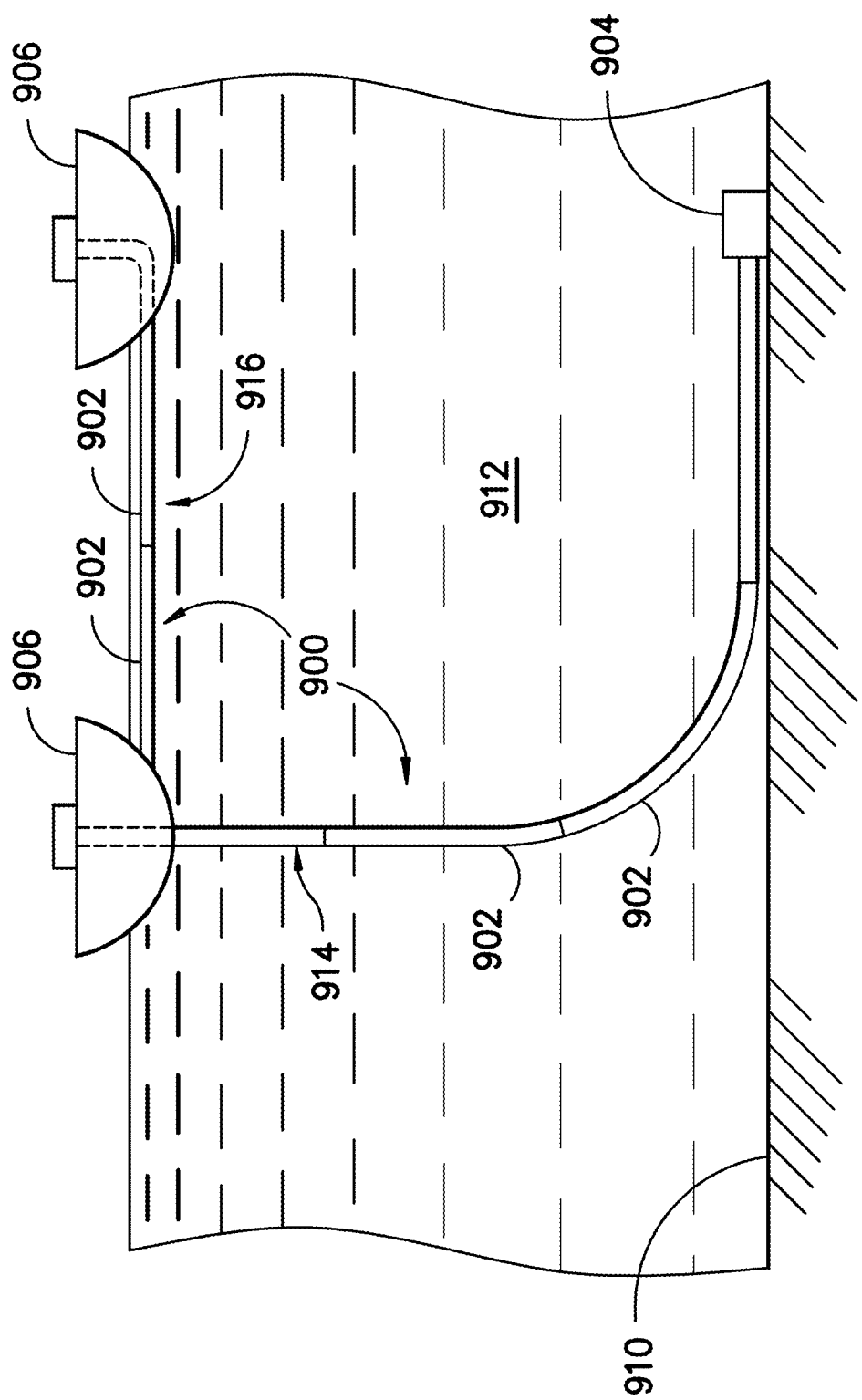
FIG. -1-

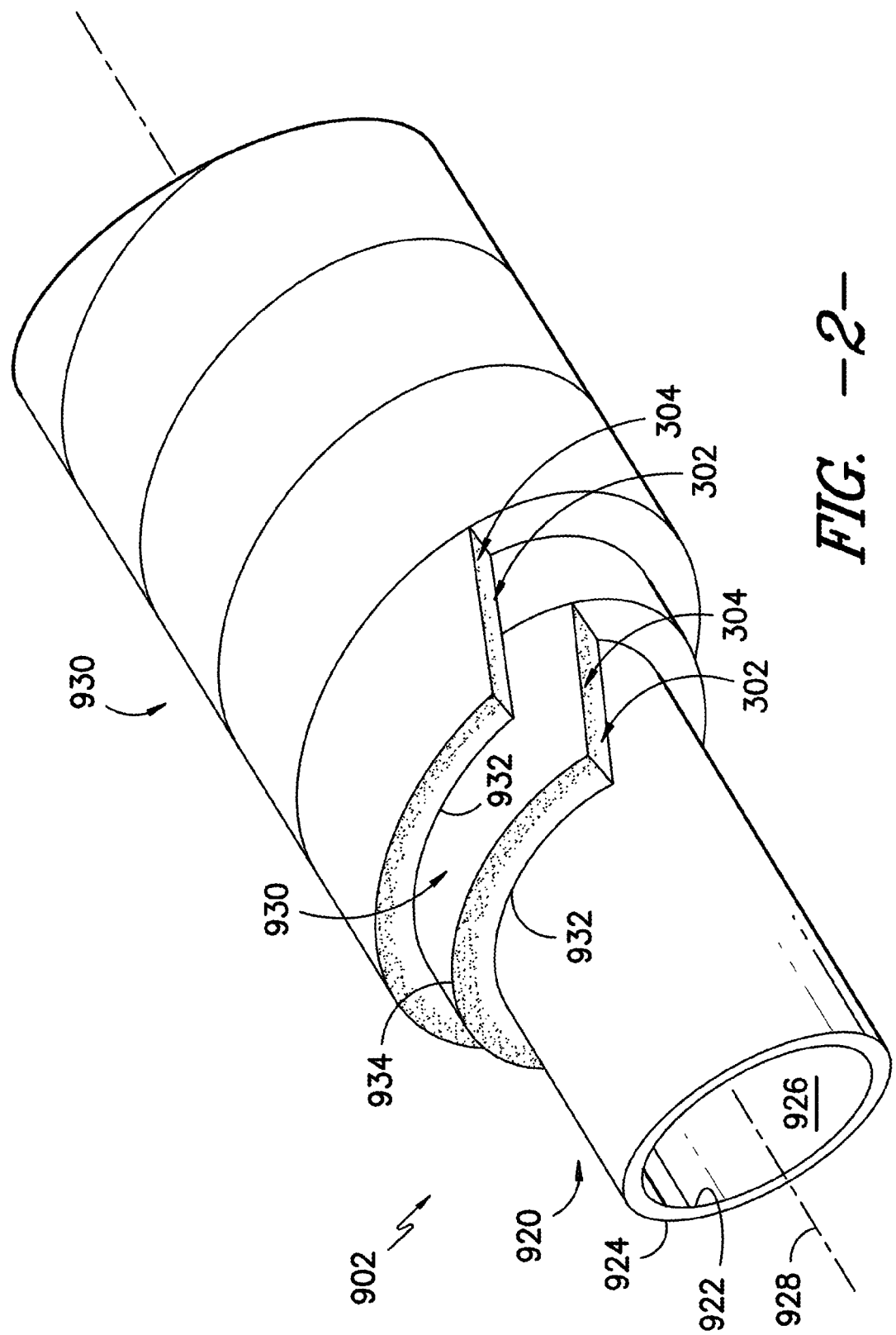

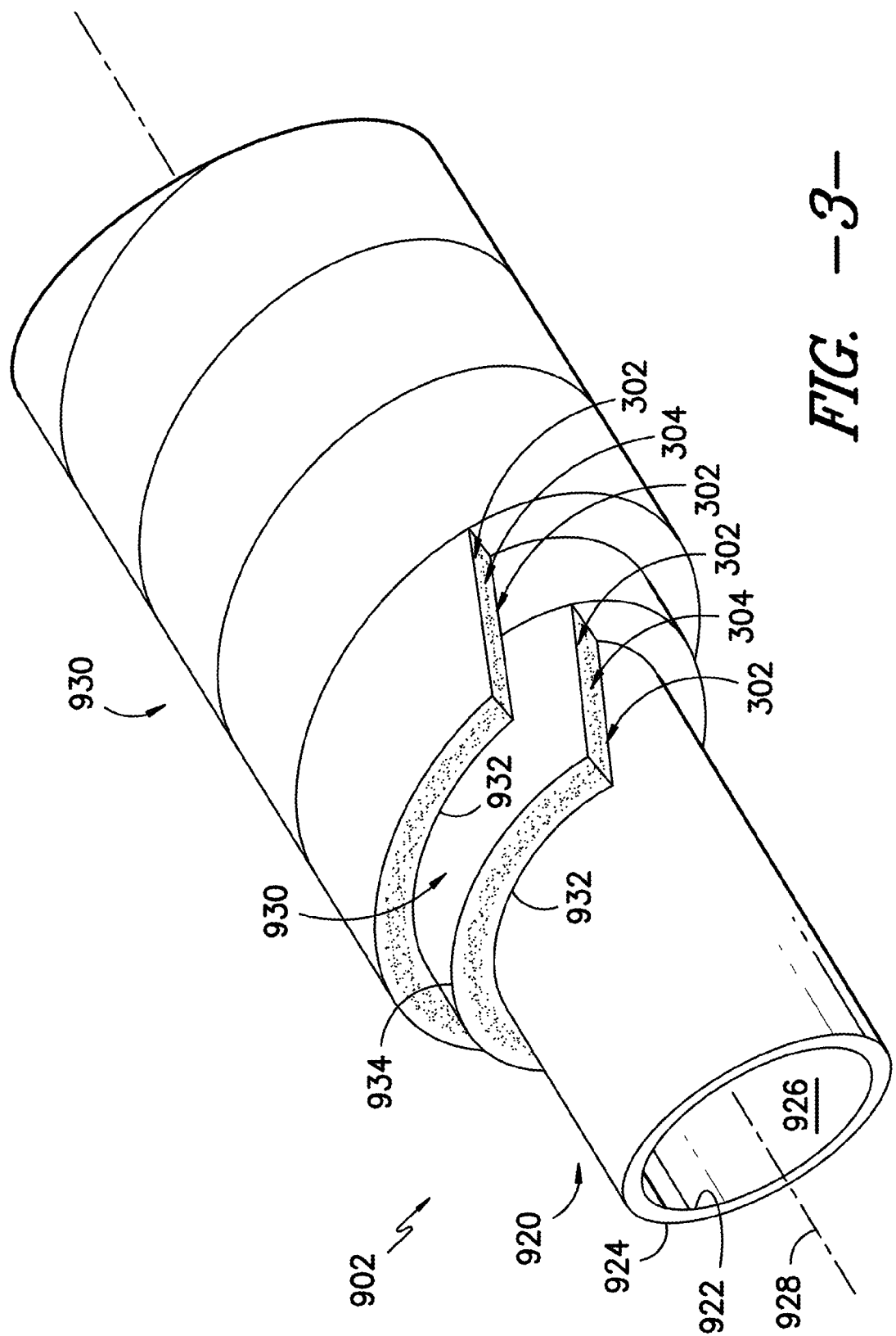
FIG. -3-

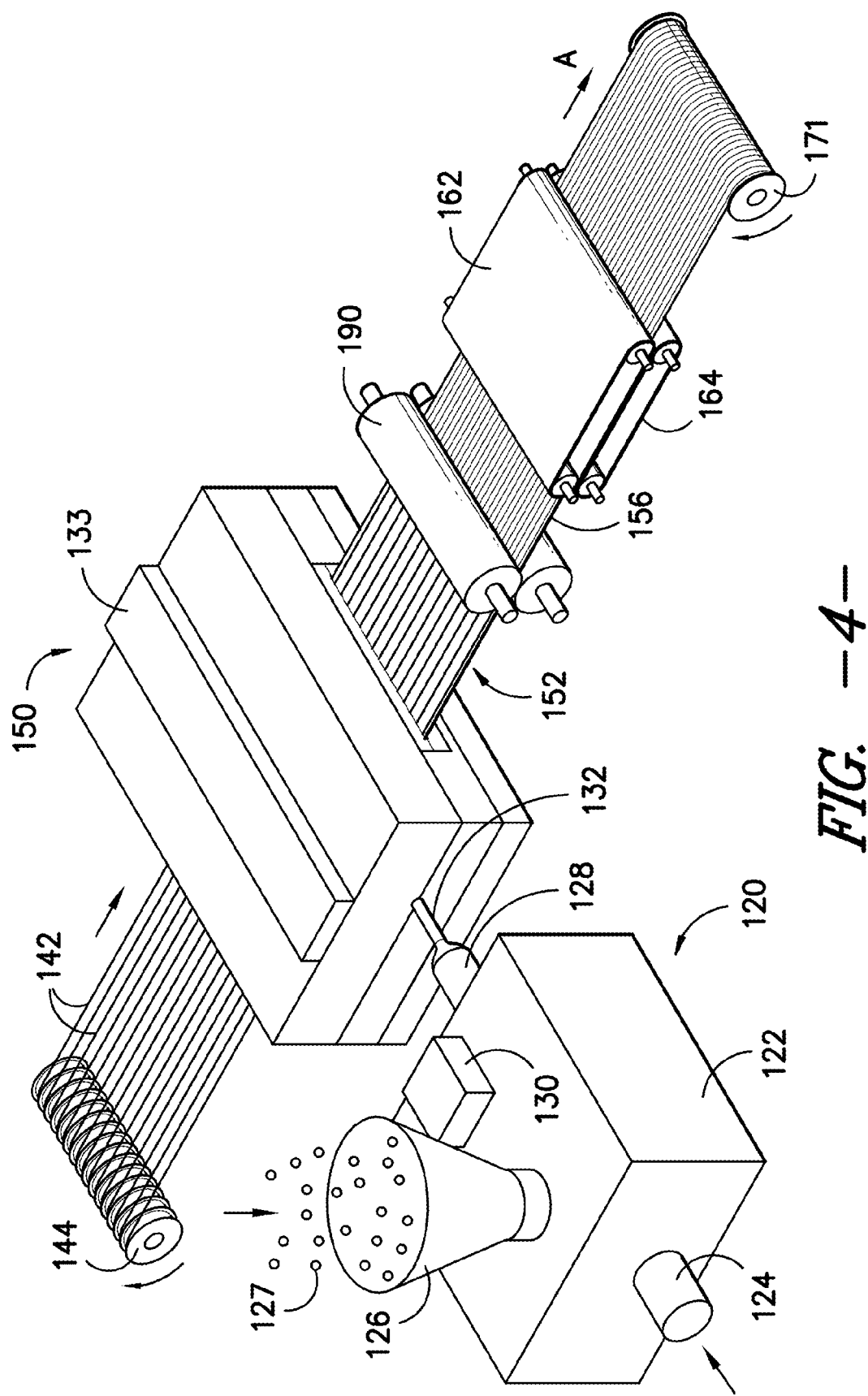
FIG. -4-

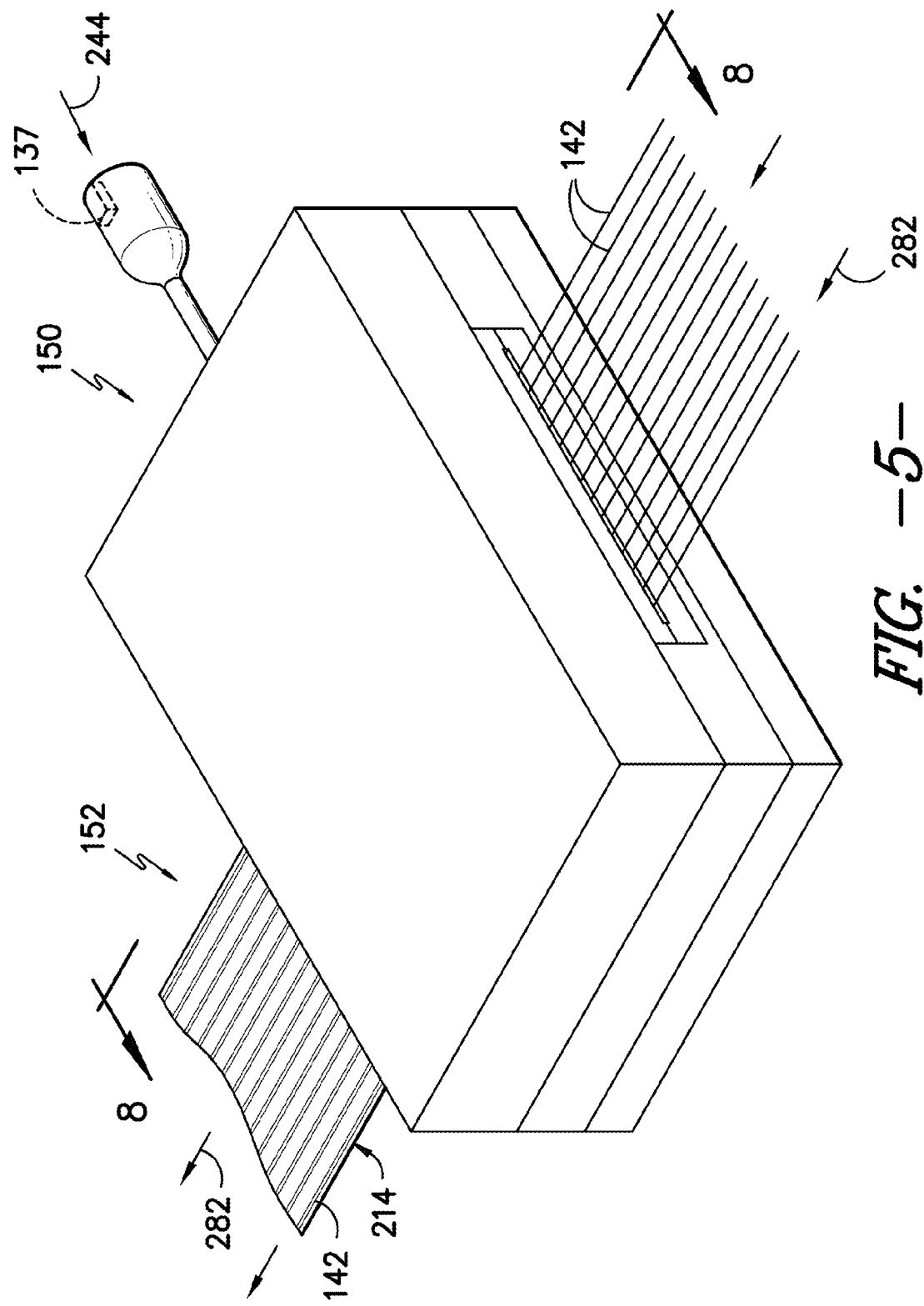
FIG. -5-

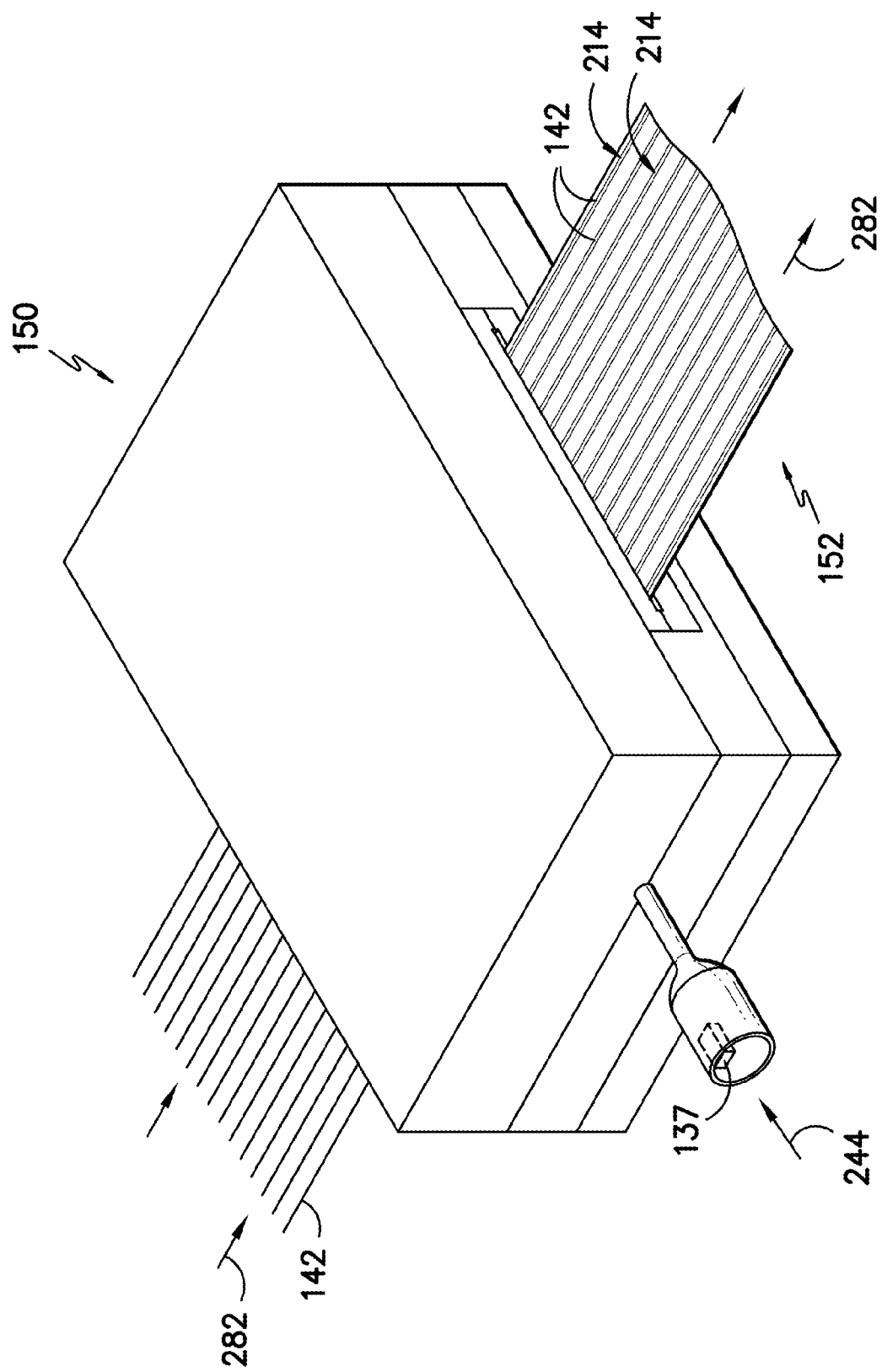
FIG. —6—

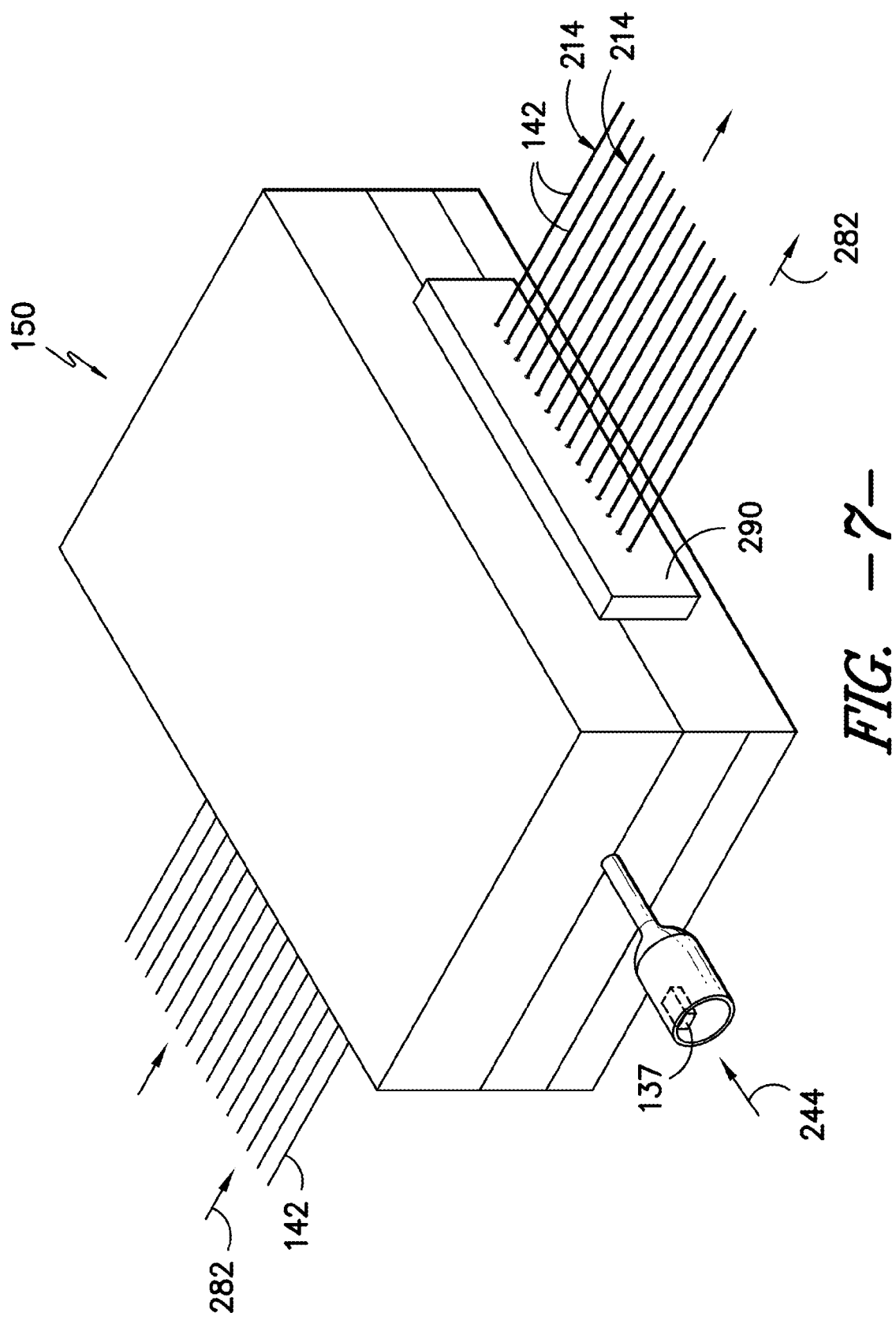

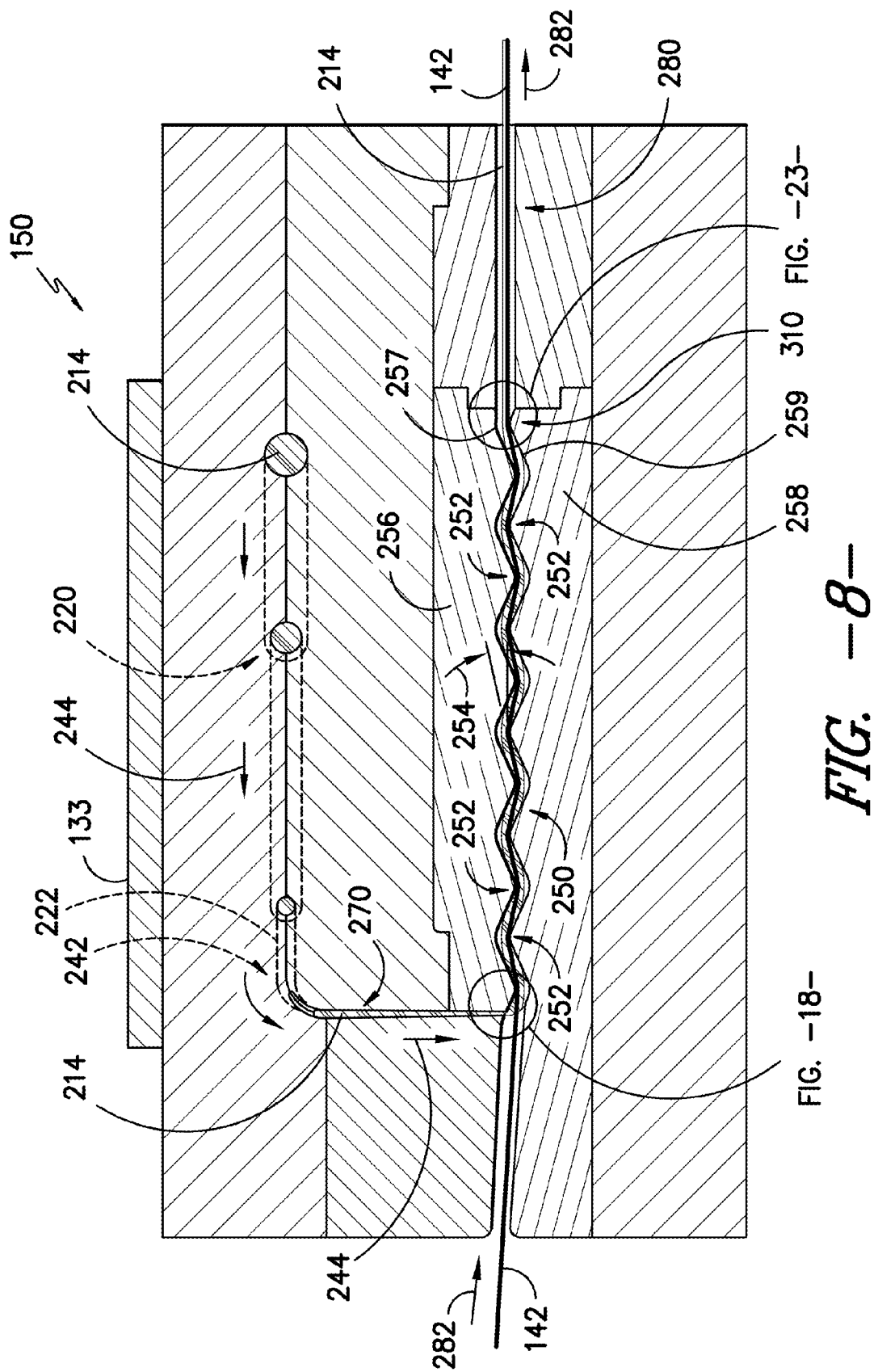

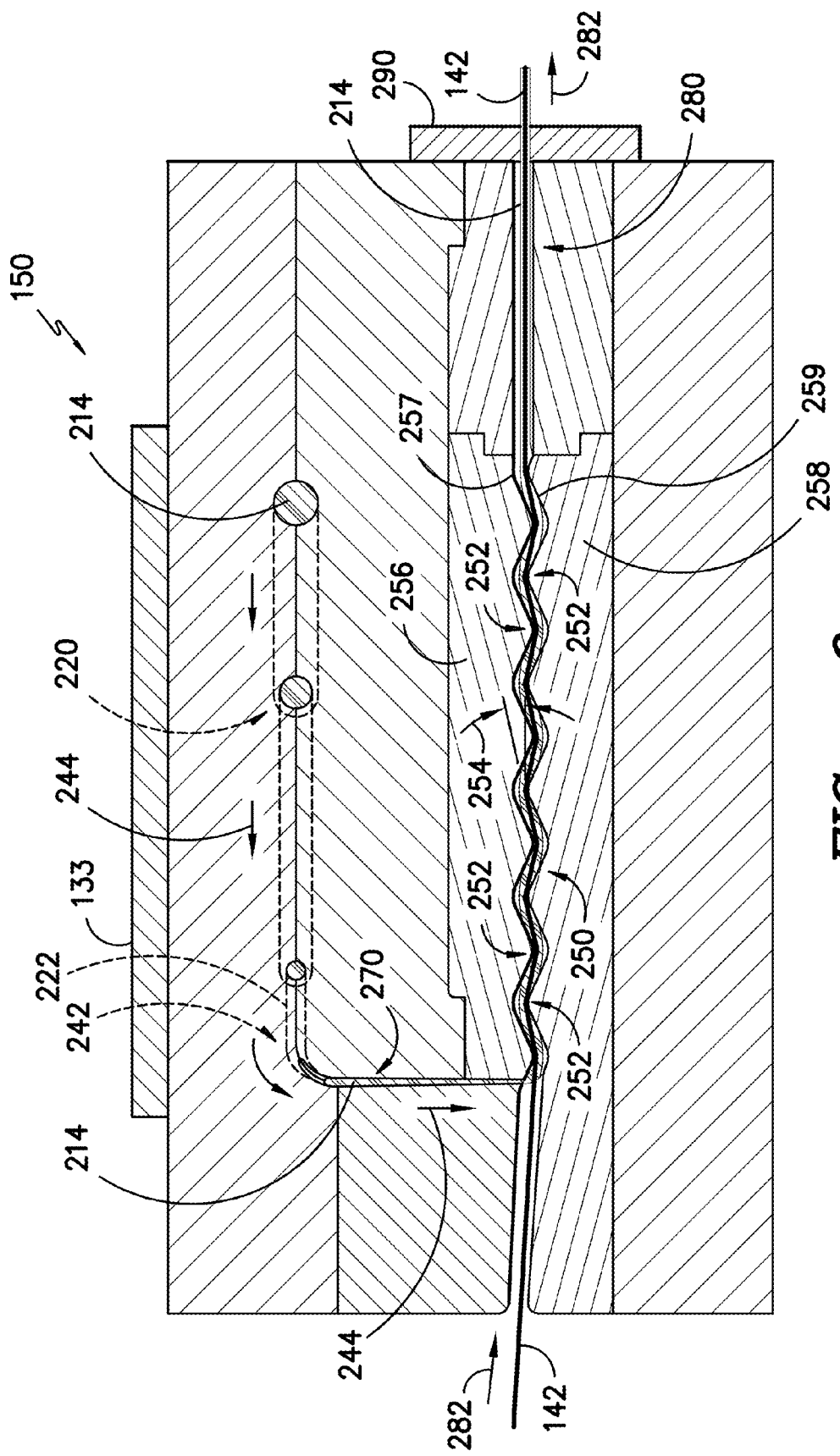
FIG. -9-

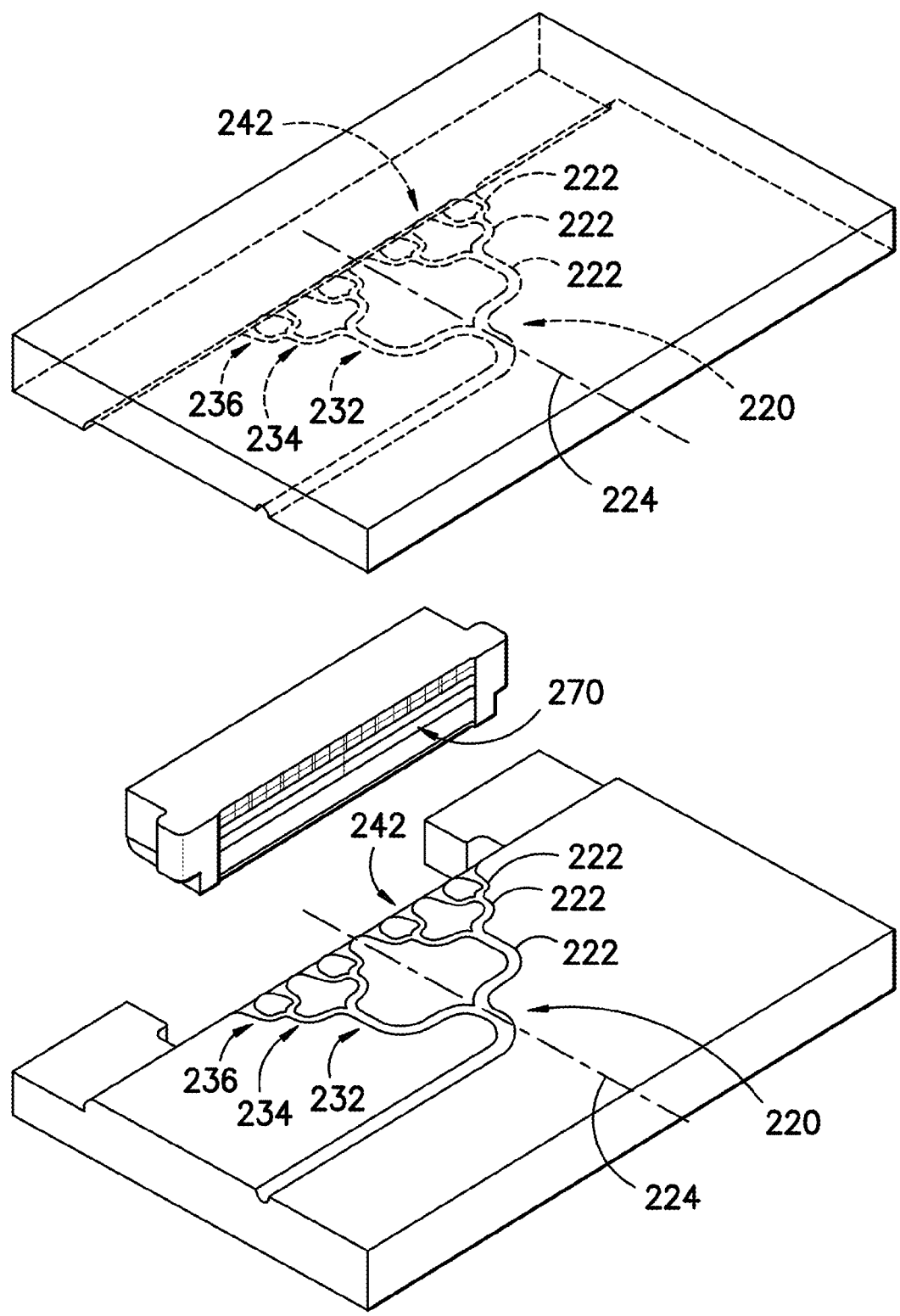
FIG. -10-

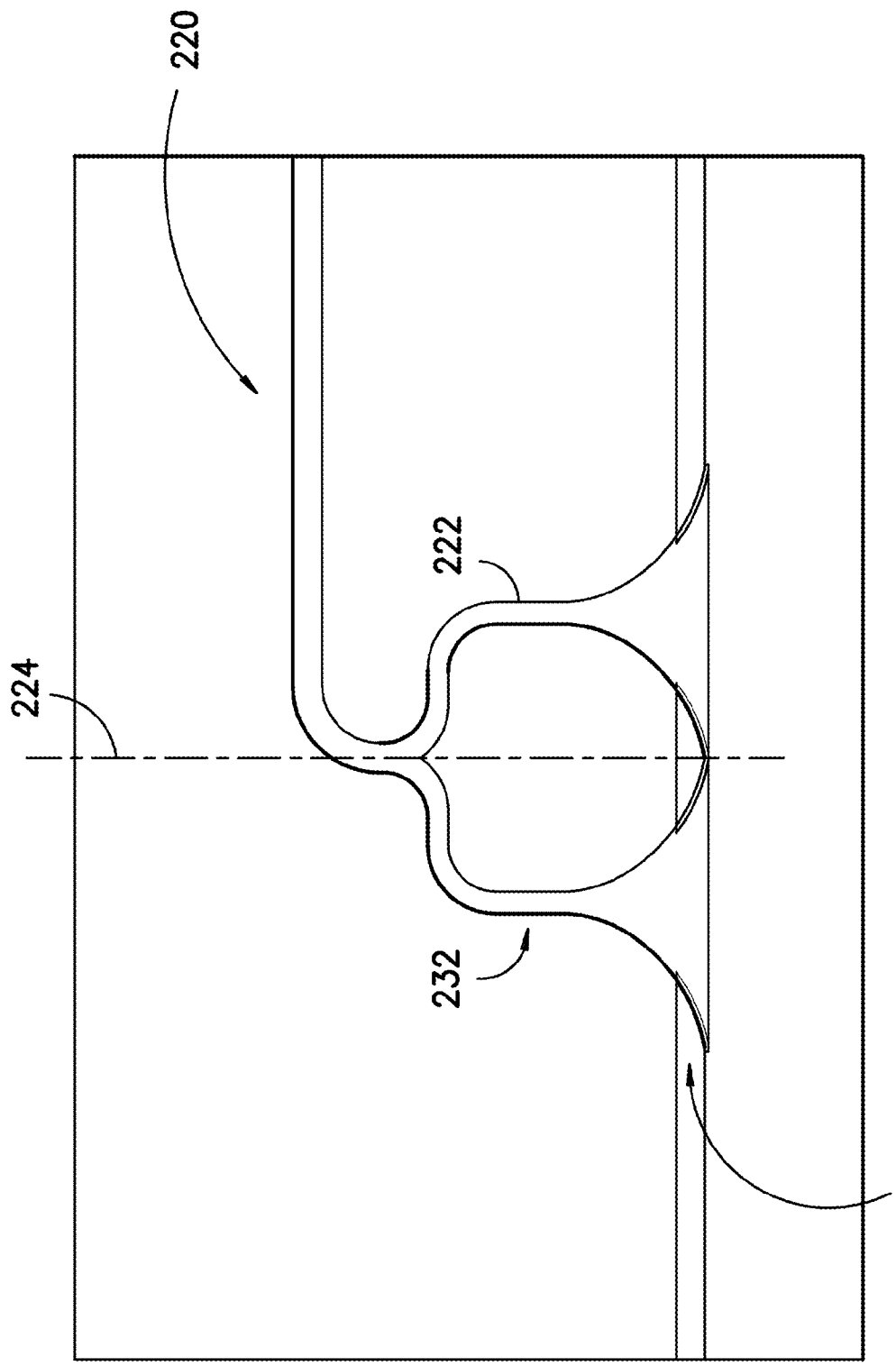

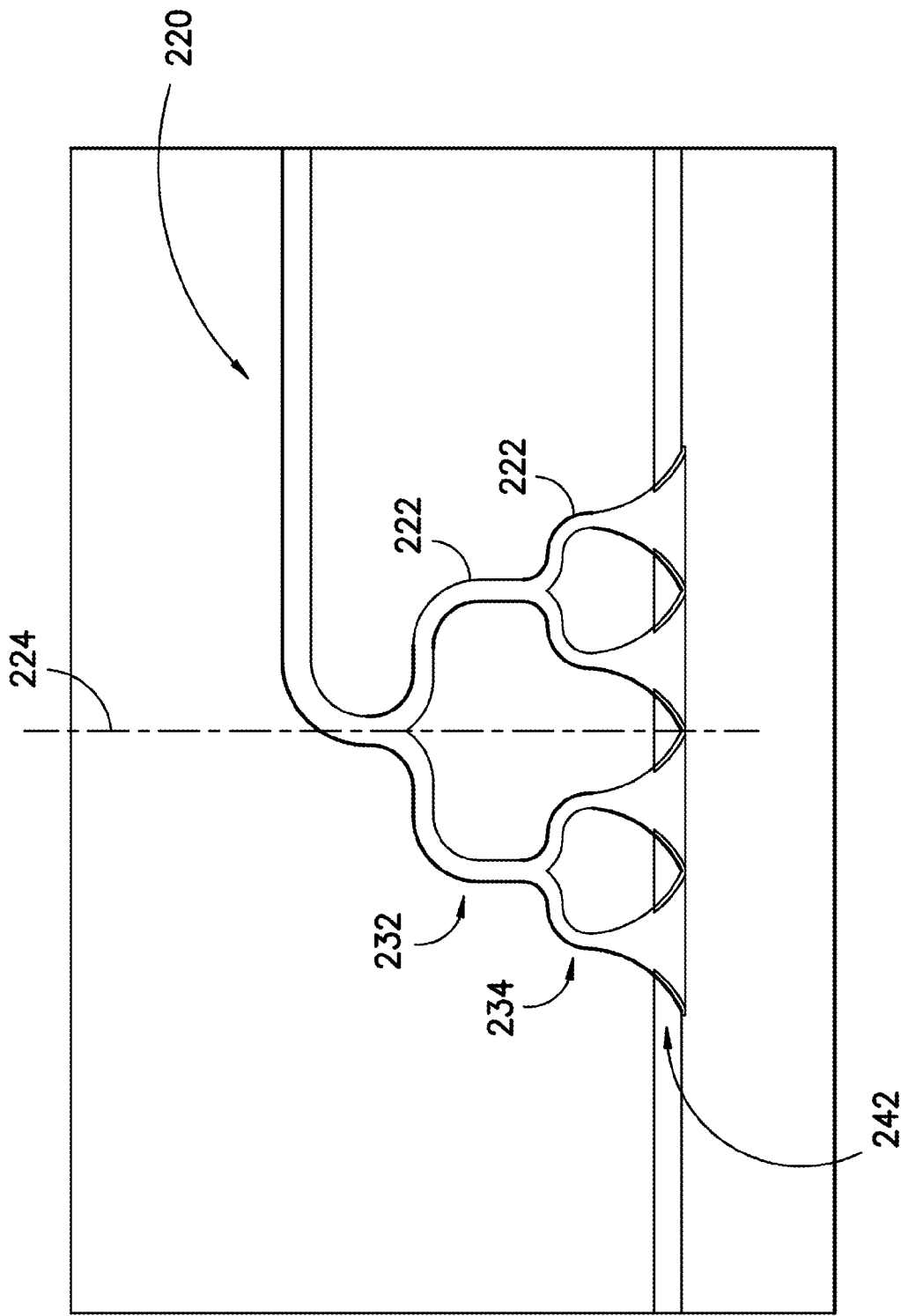
FIG. -12-

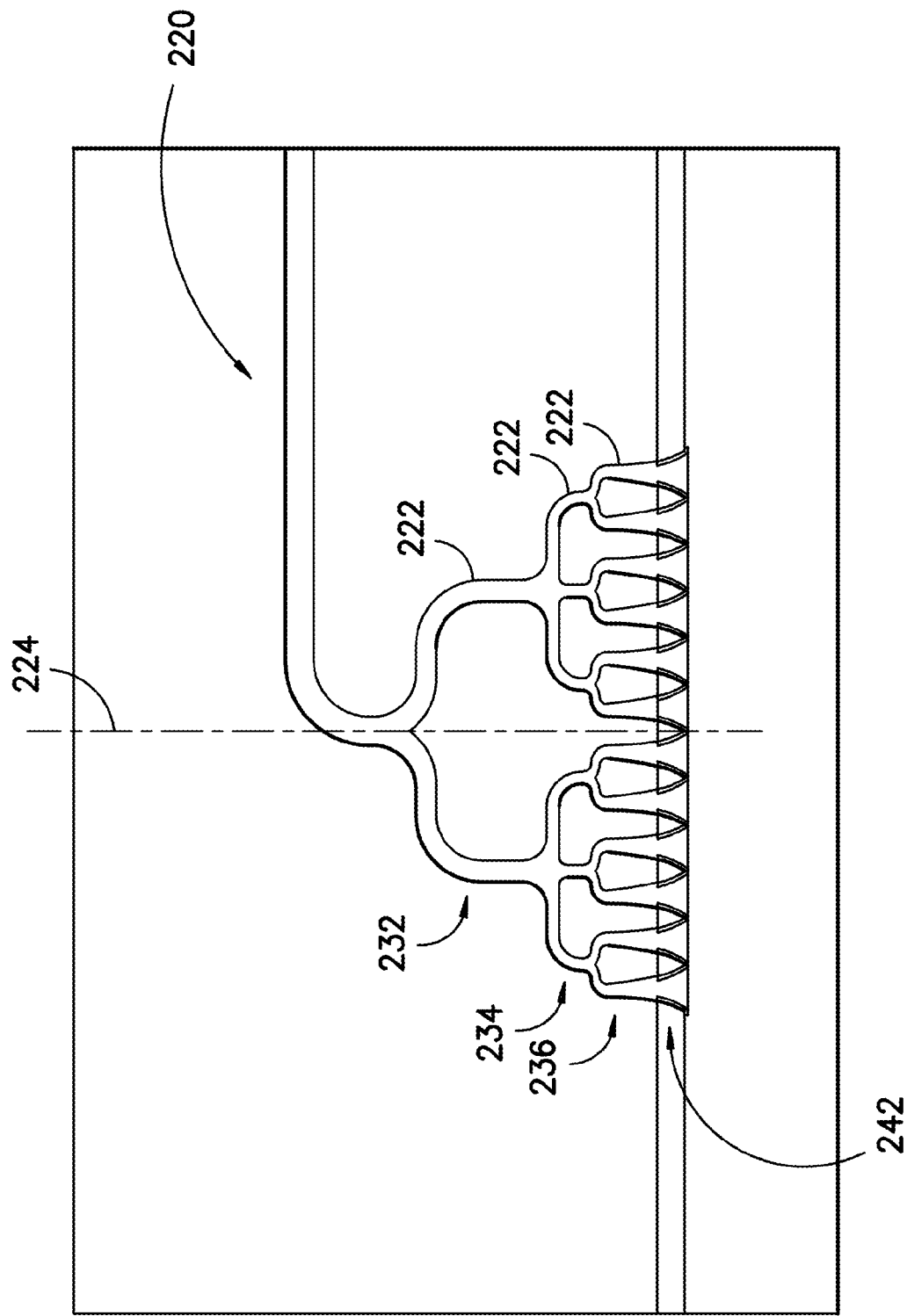
FIG. -13-

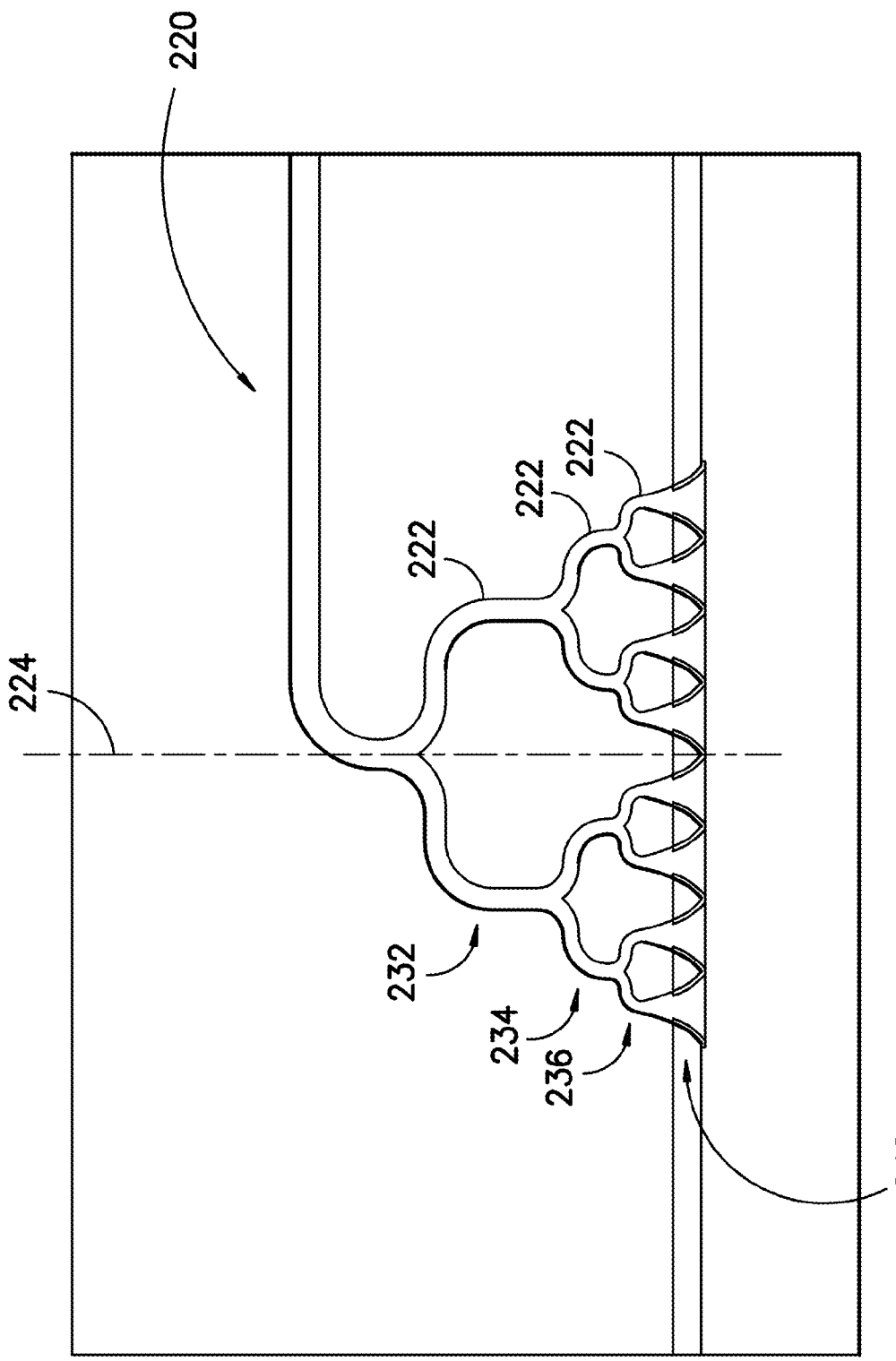

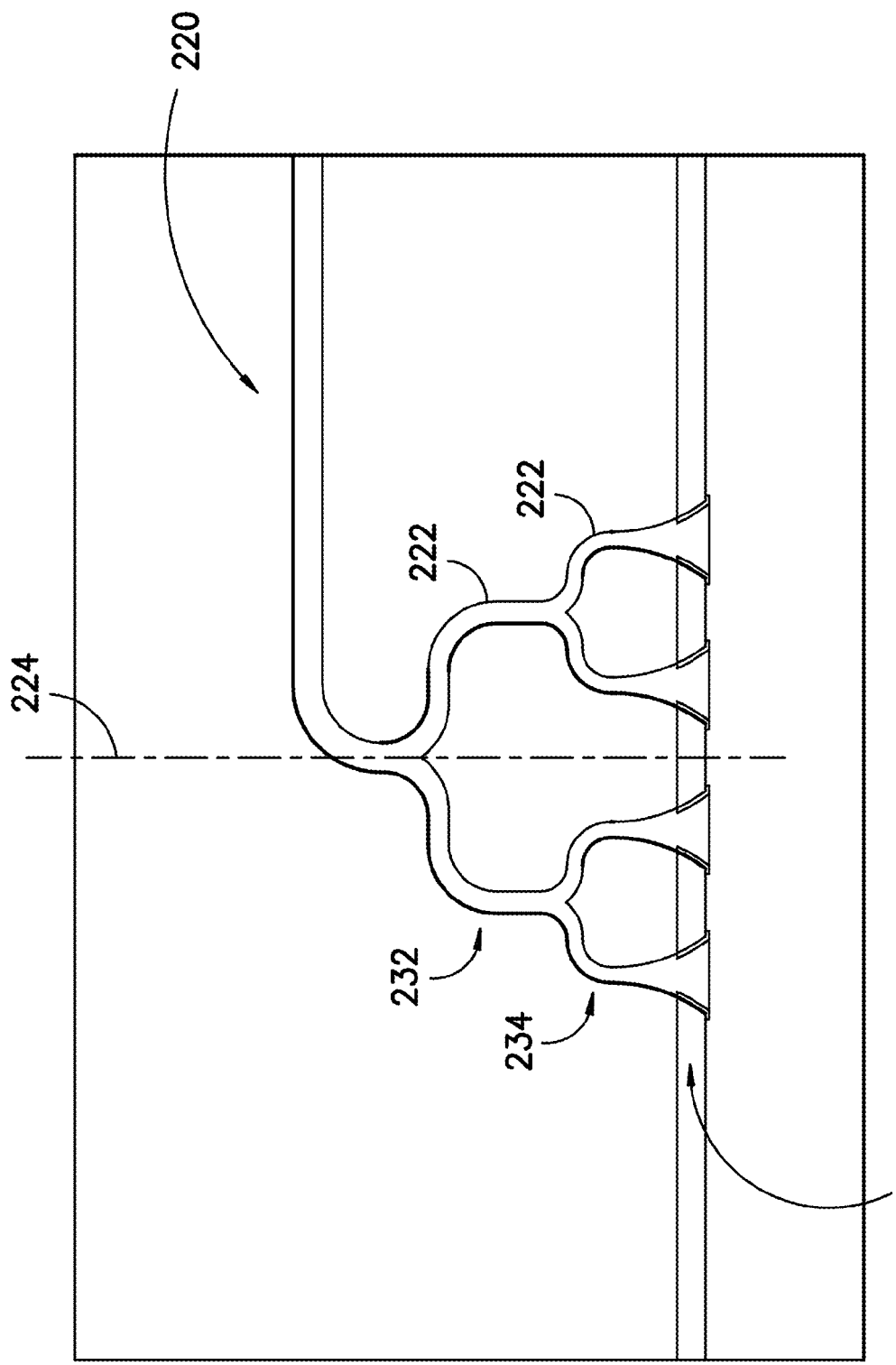
FIG. -15-

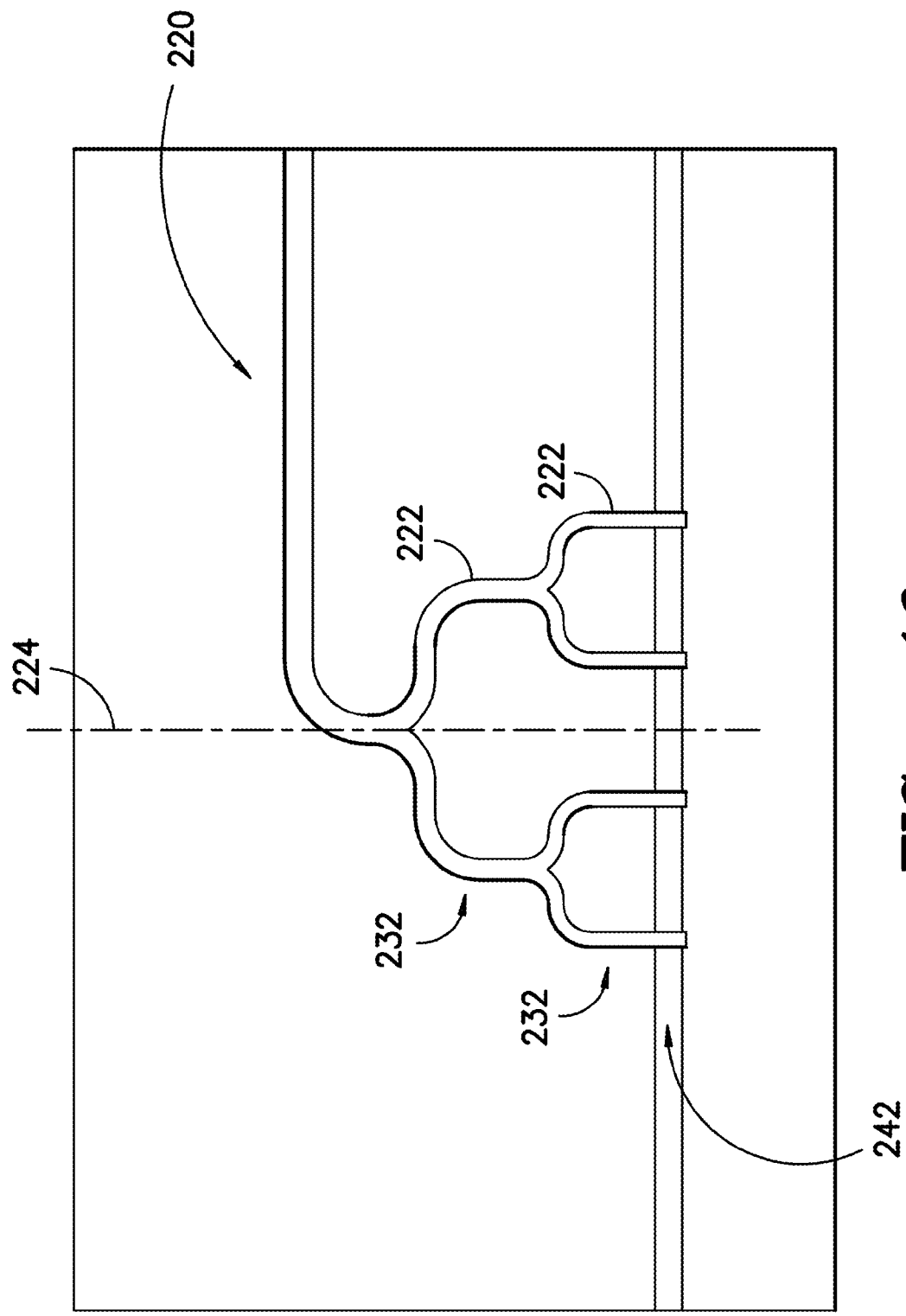

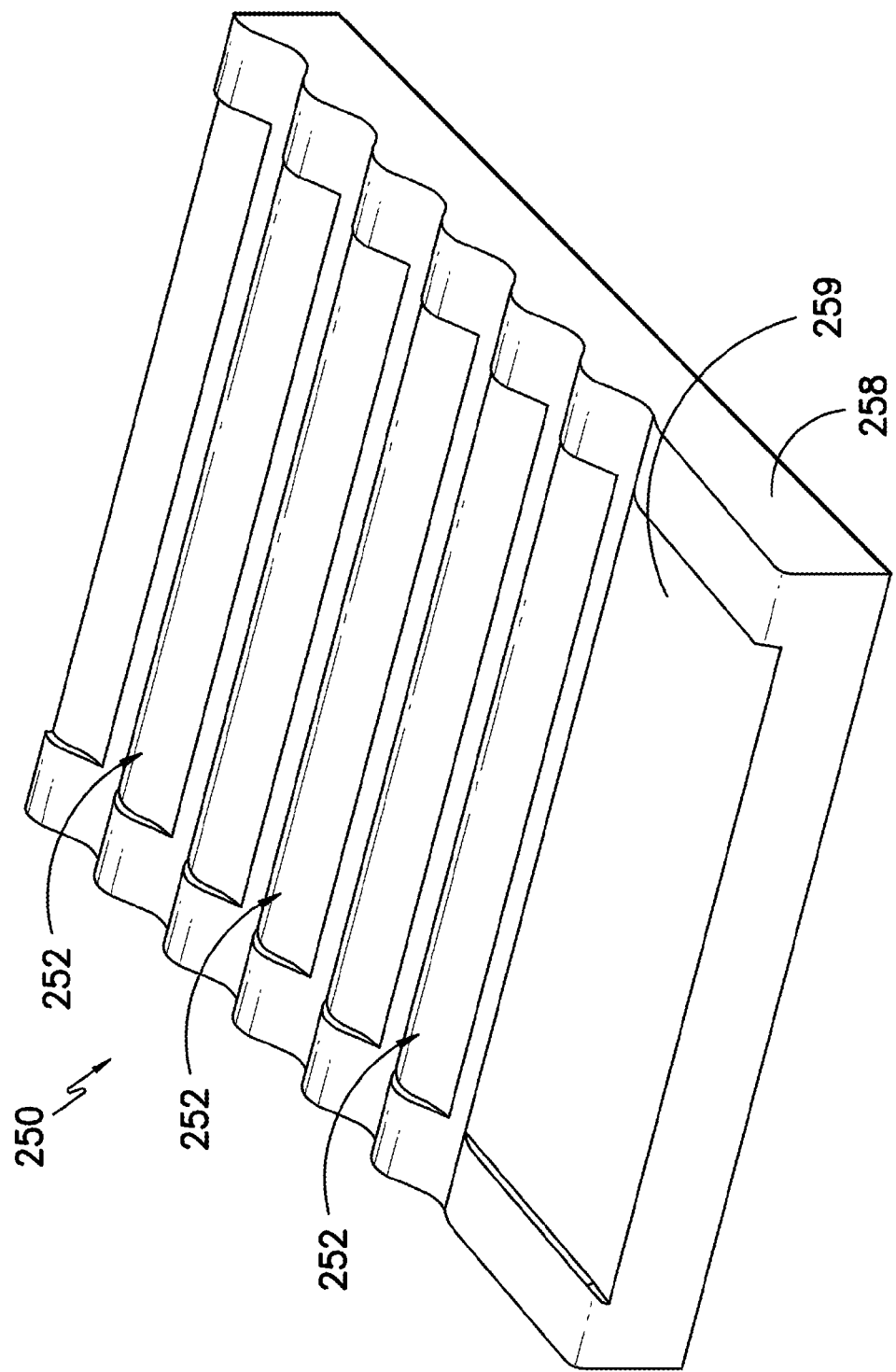

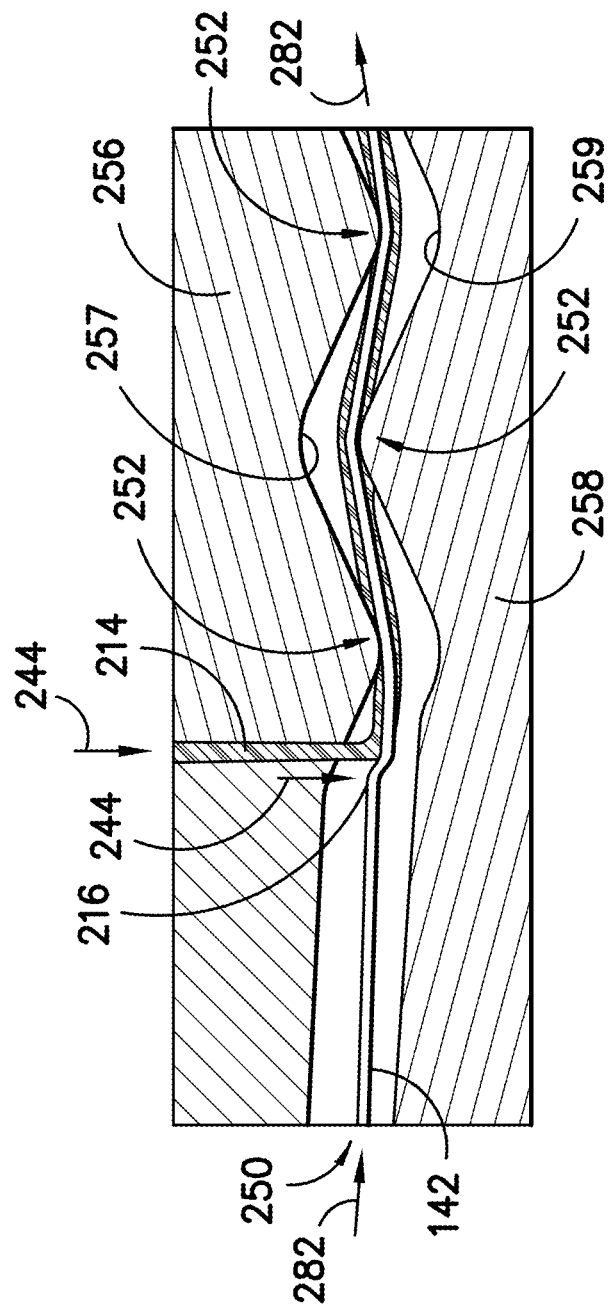
FIG. -18-

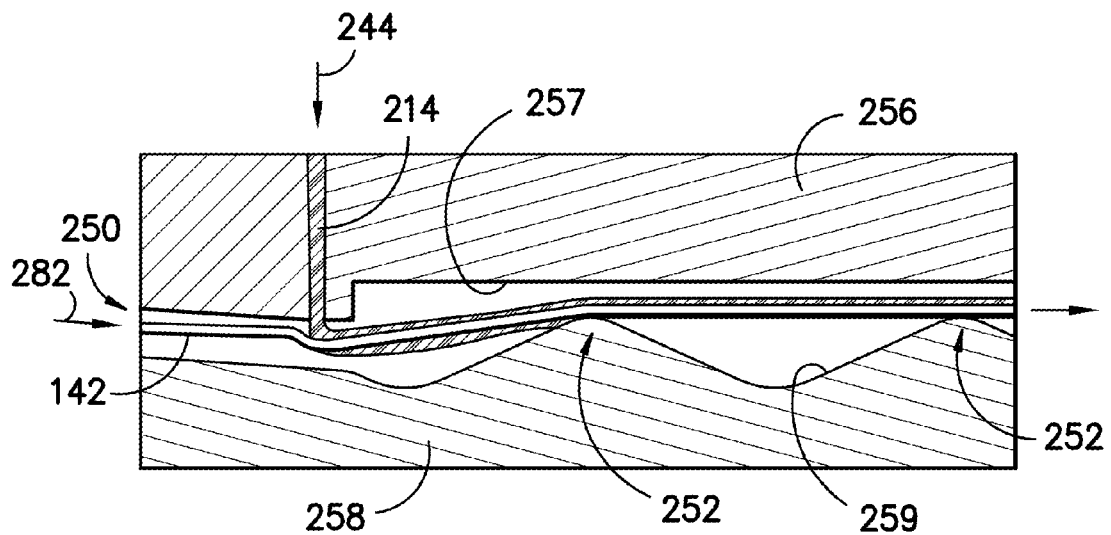
FIG. -19-
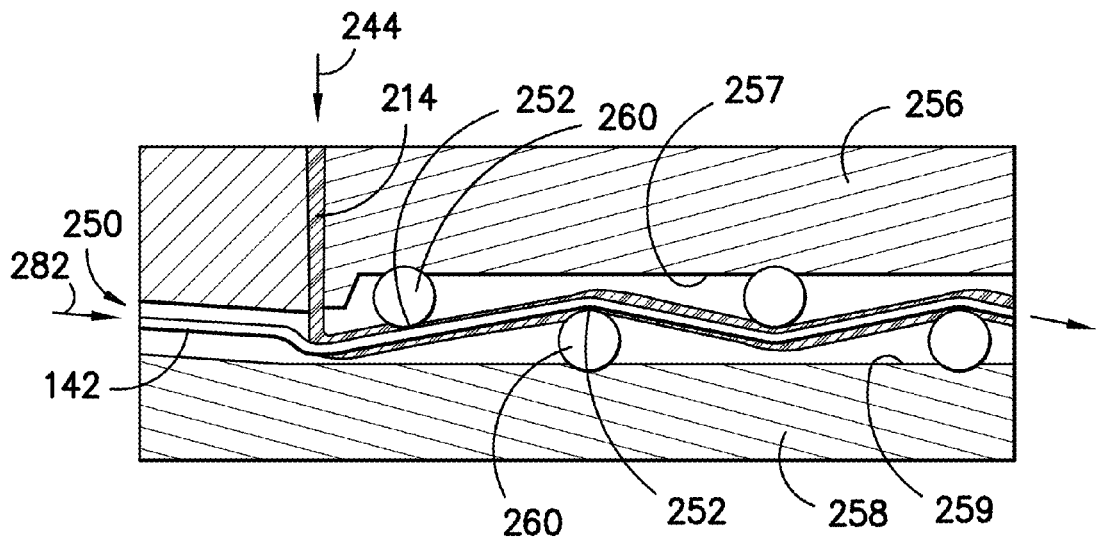
FIG. -20-

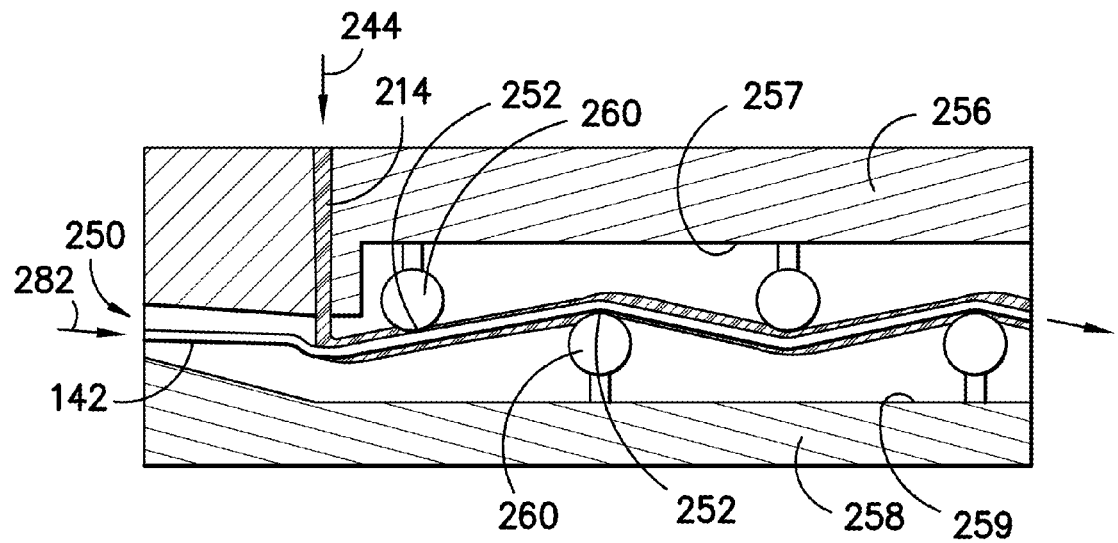
FIG. -21-
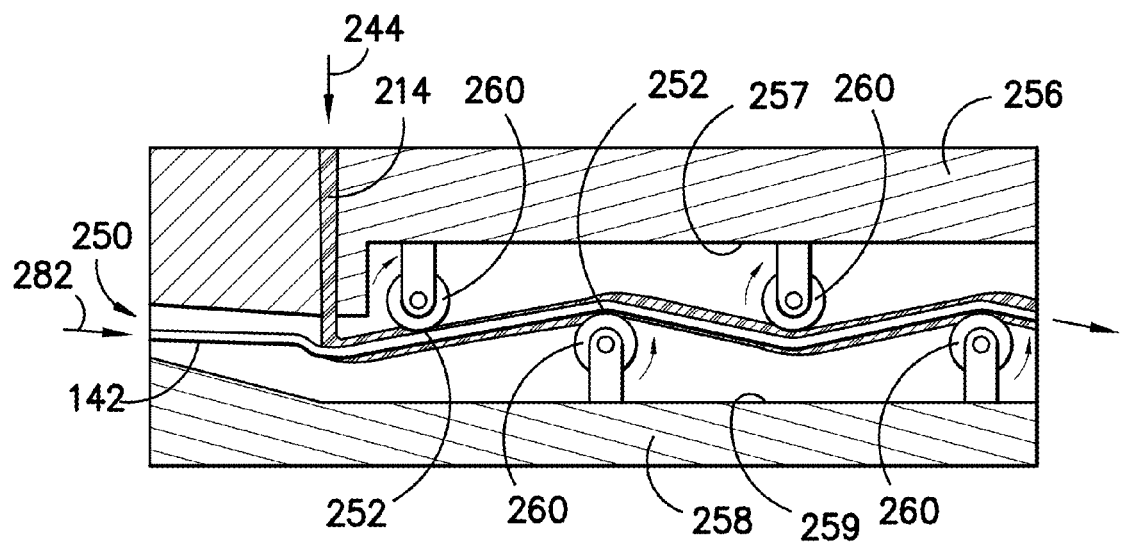
FIG. -22-

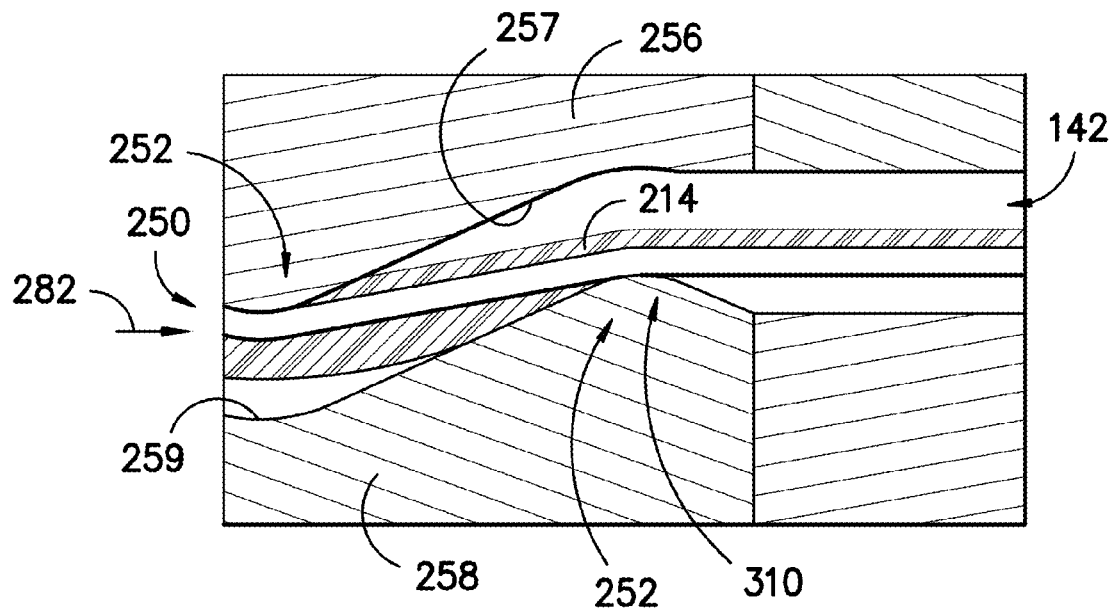
FIG. -23-
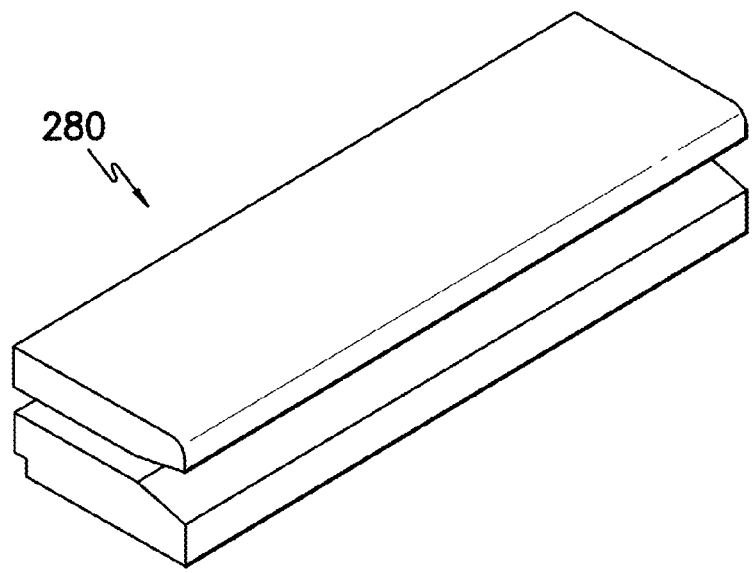
FIG. -24-

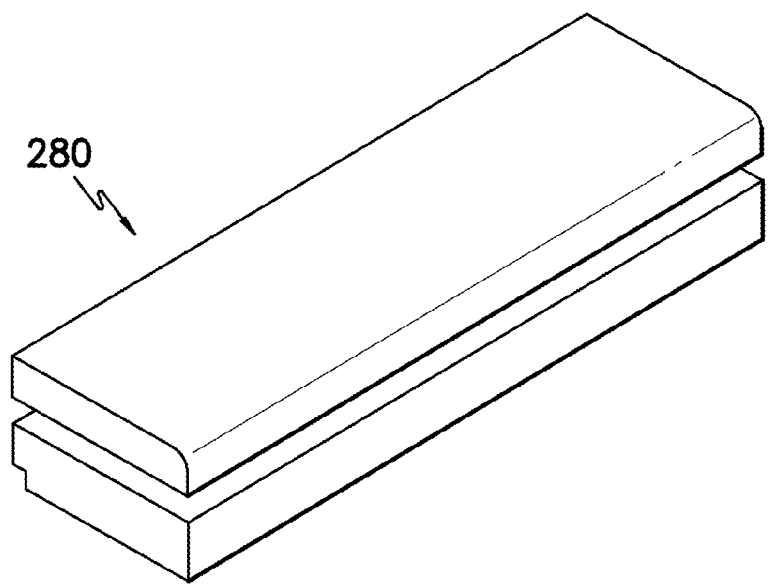
FIG. -25-
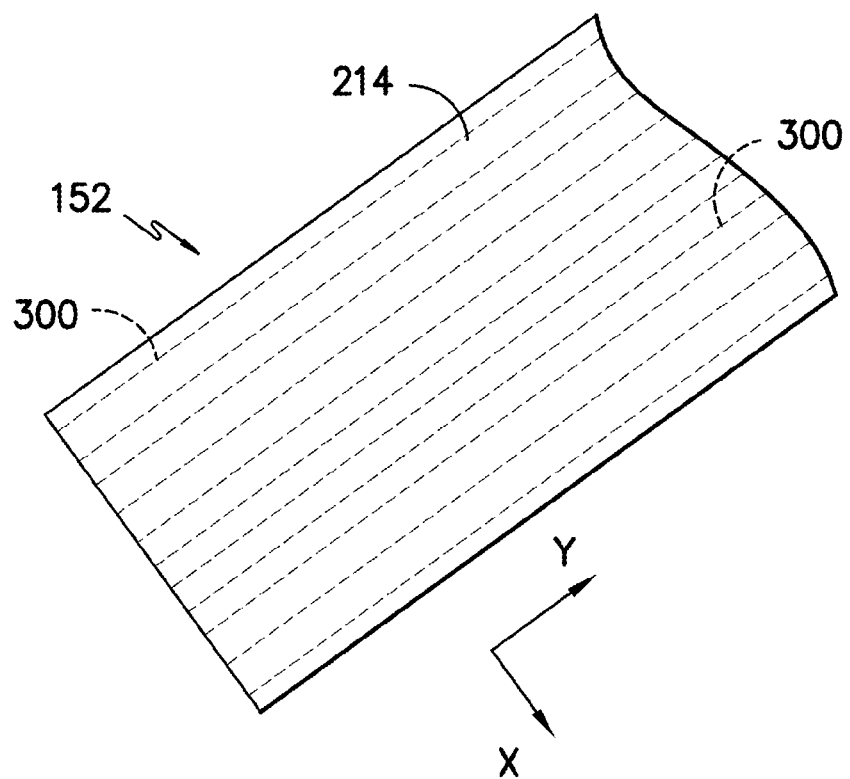
FIG. -26-

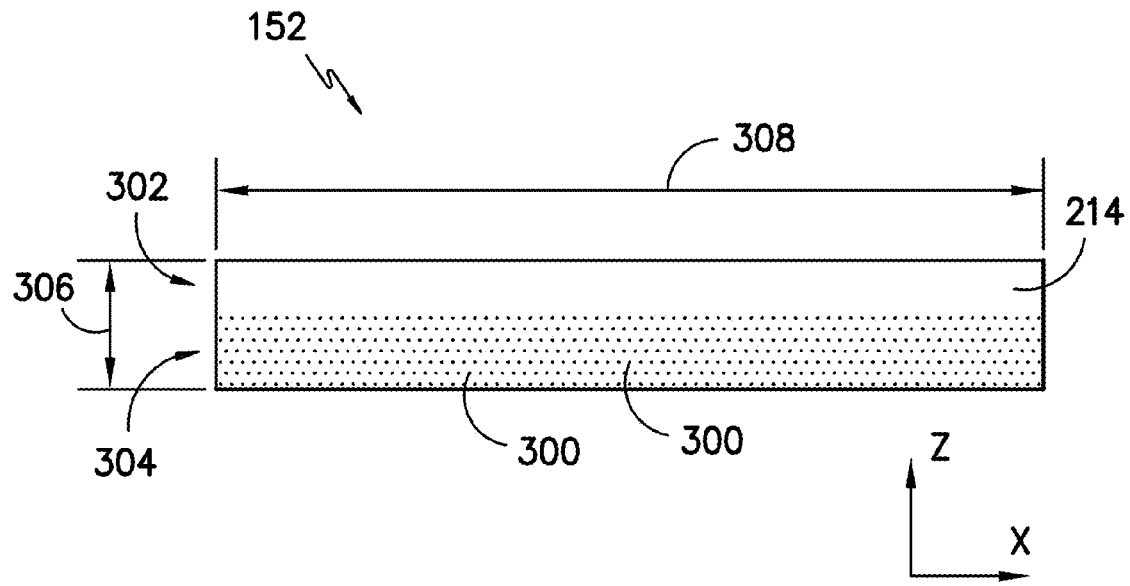
FIG. -27-
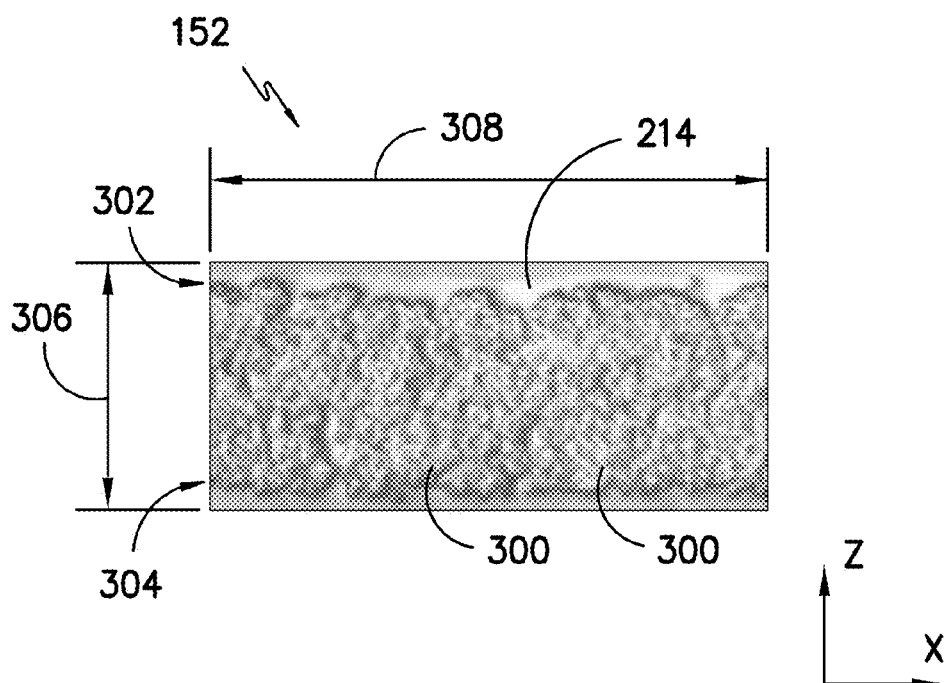
FIG. -28-

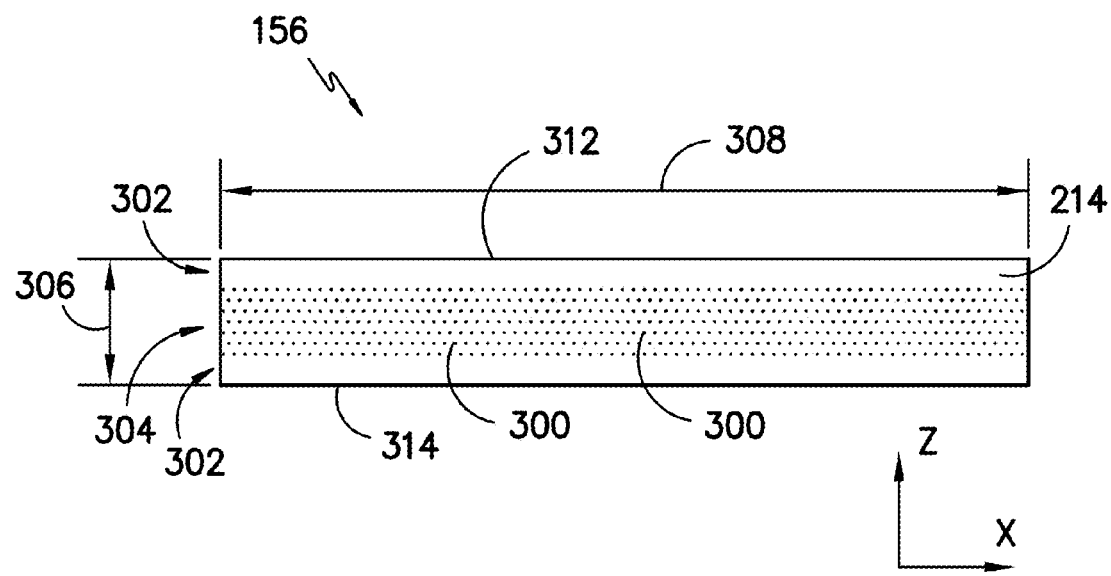
FIG. -29-
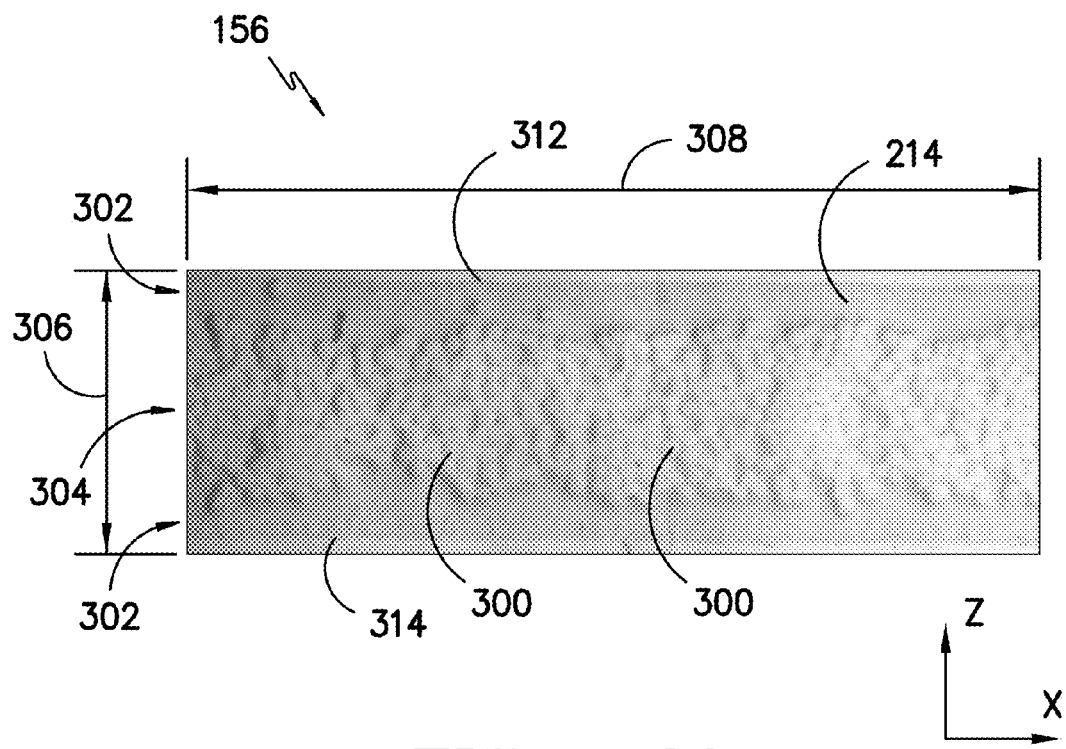
FIG. -30-

SUBSEA PIPE SECTION WITH REINFORCEMENT LAYER

CROSS REFERENCE TO RELATED APPLICATION

The present application claims filing benefit of U.S. Provisional Patent Application Ser. No. 61/660,288 having a filing date of Jun. 15, 2012, which is incorporated by reference herein in its entirety.

BACKGROUND OF THE INVENTION

Fiber rovings have been employed in a wide variety of applications. For example, such rovings have been utilized to form fiber-reinforced composite rods. The rods may be utilized as lightweight structural reinforcements. For example, power umbilicals are often used in the transmission of fluids and/or electric signals between the sea surface and equipment located on the sea bed. To help strengthen such umbilicals, attempts have been made to use pultruded carbon fiber rods as separate load carrying elements.

Another application that is particularly suited for the use of fiber rovings is in the formation of profiles. Profiles are pultruded parts with a wide variety of cross-sectional shapes, and may be employed as a structural member for window lineals, decking planks, railings, balusters, roofing tiles, siding, trim boards, pipe, fencing, posts, light posts, highway signage, roadside marker posts, etc. Hollow profiles have been formed by pulling ("pultruding") continuous fiber rovings through a resin and then shaping the fiber-reinforced resin within a pultrusion die.

Further, fiber rovings may generally be utilized in any suitable applications to form, for example, suitable fiber reinforced plastics. As is generally known in the art, rovings utilized in these applications are typically combined with a polymer resin.

For many such applications, the fiber rovings are utilized to form fiber-reinforced tapes. The tapes may be further processed to form, for example, rods or pultruded parts as discussed above, or may themselves be utilized in a wide variety of applications. One such particularly useful application is in subsea piping, such as in the oil and gas industries, wherein the tapes are utilized to reinforce the pipe sections utilized in subsea applications.

There are many significant problems, however, with currently known rovings and the resulting applications that utilize such rovings. For example, many rovings rely upon thermoset resins (e.g., vinyl esters) to help achieve desired strength properties. Thermoset resins are difficult to use during manufacturing and do not possess good bonding characteristics for forming layers with other materials. Further, attempts have been made to utilize ravings with thermoplastic polymers in other types of applications. U.S. Patent Publication No. 2005/0186410 to Bryant, et al., for instance, describes attempts that were made to embed carbon fibers into a thermoplastic resin to form a composite core of an electrical transmission cable. Unfortunately, Bryant, et al. notes that these cores exhibited flaws and dry spots due to inadequate wetting of the fibers, which resulted in poor durability and strength. Another problem with such cores is that the thermoplastic resins could not operate at a high temperature.

Further, problems exist with presently known fiber reinforced tapes utilized in many applications, such as subsea applications. For example, tapes may be wrapped around existing products, such as pipe sections, to reinforce the pipe sections. However, presently known tapes may not adequately bond with such products to provide sufficient reinforcement.

As such, a need currently exists for an improved subsea pipe system and pipe section thereof, and for an improved method for forming a subsea pipe section. Specifically, a need currently exists for subsea piping and methods that utilizes fiber reinforced tapes for reinforcement thereof, and which tapes provide improved bonding properties. Additionally, such tapes may provide the desired strength, durability, and temperature performance demanded by subsea applications.

SUMMARY OF THE INVENTION

In accordance with one embodiment of the present invention, a subsea pipe section is disclosed. The subsea pipe section includes a hollow body formed from a polymer material, the hollow body having an inner surface and an outer surface, the inner surface defining an interior. The subsea pipe section further includes a reinforcement layer surrounding and bonded to the hollow body, the reinforcement layer having an inner surface and an outer surface. The reinforcement layer is formed from a fiber reinforced thermoplastic material and has a resin rich portion and a fiber rich portion. The resin rich portion includes the inner surface of the reinforcement layer and is in contact with the outer surface of the hollow body. The fiber rich portion is spaced from the inner surface of the reinforcement layer.

In accordance with another embodiment of the present invention, a method for forming a subsea pipe section is disclosed. The method includes surrounding a hollow body with a reinforcement layer such that a resin rich portion of the reinforcement layer is in contact with an outer surface of the hollow body and a fiber rich portion is spaced from the outer surface relative to the resin rich portion. The hollow body is formed from a polymer material, and the reinforcement layer is formed from a fiber reinforced thermoplastic material and has the resin rich portion and the fiber rich portion. The method further includes heating the reinforcement layer to a consolidation temperature, and consolidating the hollow body and the reinforcement layer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 illustrates a subsea pipe system in accordance with one embodiment of the present disclosure;

FIG. 2 is a perspective cut-away view of one embodiment of a subsea pipe section;

FIG. 3 is a perspective cut-away view of another embodiment of a subsea pipe section;

FIG. 4 is a schematic illustration of one embodiment of an impregnation system for use in the present disclosure;

FIG. 5 is a perspective view of one embodiment of a die for use in the present disclosure;

FIG. 6 is an opposing perspective view of one embodiment of a die for use in the present disclosure;

FIG. 7 is an opposing perspective view of another embodiment of a die for use in the present disclosure;

FIG. 8 is a cross-sectional view of the die shown in FIG. 5;

FIG. 9 is a cross-sectional view of the die shown in FIG. 7;

FIG. 10 is an exploded view of one embodiment of a manifold assembly and gate passage for a die that may be employed in the present disclosure;

FIG. 11 is a plan view of one embodiment of a manifold assembly that may be employed in the present disclosure;

FIG. 12 is a plan view of another embodiment of a manifold assembly that may be employed in the present disclosure;

FIG. 13 is a plan view of another embodiment of a manifold assembly that may be employed in the present disclosure;

FIG. 14 is a plan view of another embodiment of a manifold assembly that may be employed in the present disclosure;

FIG. 15 is a plan view of another embodiment of a manifold assembly that may be employed in the present disclosure;

FIG. 16 is a plan view of another embodiment of a manifold assembly that may be employed in the present disclosure;

FIG. 17 is a perspective view of one embodiment of a second impregnation plate at least partially defining an impregnation zone that may be employed in the present disclosure;

FIG. 18 is a close-up cross-sectional view, as indicated in FIG. 8, of one embodiment of a portion of an impregnation zone that may be employed in the present disclosure;

FIG. 19 is a close-up cross-sectional view of another embodiment of a portion of an impregnation zone that may be employed in the present disclosure;

FIG. 20 is a close-up cross-sectional view of another embodiment of a portion of an impregnation zone that may be employed in the present disclosure;

FIG. 21 is a close-up cross-sectional view of another embodiment of a portion of an impregnation zone that may be employed in the present disclosure;

FIG. 22 is a close-up cross-sectional view of another embodiment of a portion of an impregnation zone that may be employed in the present disclosure;

FIG. 23 is a close-up cross-sectional view, as indicated in FIG. 8, of one embodiment of a downstream end portion of an impregnation zone that may be employed in the present disclosure;

FIG. 24 is a perspective view of one embodiment of a land zone that may be employed in the present disclosure;

FIG. 25 is a perspective view of another embodiment of a land zone that may be employed in the present disclosure;

FIG. 26 is a perspective view of one embodiment of a tape for use in the present disclosure;

FIG. 27 is a cross-sectional view of another embodiment of a tape for use in the present disclosure;

FIG. 28 is a cross-sectional microscopy image of another embodiment of a tape for use in the present disclosure;

FIG. 29 is a cross-sectional view of another embodiment of a tape for use in the present disclosure; and FIG. 30 is a cross-sectional microscopy image of another embodiment of a tape for use in the present disclosure.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to subsea pipe sections and methods for forming subsea pipe sections. The resulting subsea pipe sections can be utilized in subsea pipe systems, which may extend at least partially underwater and may be utilized to flow various materials therethrough and/or to contain various elements therein. For example, the subsea pipe sections and resulting systems may be in oil or gas industry applications, and in some embodiments may thus flow oil or gas therethrough. A subsea pipe section formed according to the present disclosure may thus be utilized in a riser, transfer line, umbilical or other suitable subsea pipe system. Risers, transfer lines, etc. may flow oil or gas therethrough. Umbilicals may include various elements for transferring fluids and/or electric current/signals. For example, an umbilical may contain elongated umbilical elements (e.g., two or more), such as a channel element, fluid pipe, electric conductor/wire (e.g., optic fiber cable), armoring wire, etc. The subsea pipe section may enclose these elements.

A subsea pipe section according to the present disclosure includes a hollow body formed from a polymer material and one or more reinforcement layers surrounding and bonded to the hollow body. A reinforcement layer according to the present disclosure is formed from a fiber reinforced thermoplastic material and has at least one resin rich portion and a fiber rich portion. In exemplary embodiments, the reinforcement layer is a tape formed from the fiber reinforced thermoplastic material. When bonding the reinforcement layer to the hollow body, the resin rich portion may initially be placed in contact with the hollow body. This orientation of a resin rich portion such the resin rich portion contacts the hollow body advantageously allows for rapid and thorough bonding between the reinforcement layer and hollow body, by allowing efficient heating of the reinforcement layer, and in particular the resin rich portion, and thus improved consolidation of the reinforcement layer and hollow body. The orientation of an opposing resin rich portion may further advantageously allow for efficient heating and consolidation with additional reinforcement layers. The use of reinforcement layers with such improved bonding provides the pipe section with increased strength while allowing the pipe section to maintain suitable flexibility for spooling, coiling, etc. The increased strength provides improved burst pressure resistance and tensile strength, allowing for the pipe section to be utilized at deeper water depths and for longer periods of time.

FIG. 1 illustrates one embodiment of a subsea pipe system 900. The pipe system 900 includes one or more subsea pipe sections 902, and extends between a subsea facility 904, such as a well bore, and a vessel 906, such as a drilling rig, ship, etc., or between two vessels 906, or otherwise. The subsea facility 904 may be adjacent to the bottom 910 of a body of water 912. The vessel 906 and/or subsea facility 904 may be permanently installed or movable within the body of water 912. In certain embodiments, the subsea pipe system 900 may be employed in water having a depth of about 2,500 meters or more, in some embodiments about 4,000 meters or more, and in some embodiments, from about 5,000 to about 15,000 meters. The subsea pipe system 900 may span significant portions of these depths.

In exemplary embodiments, a subsea pipe system 900 is utilized to transport a liquid, such as oil, or a gas between the subsea facility 904 and the vessel 906, or to contain various elements therein. The pipe system 900 may thus be, or include, for example, a riser 914, a transport line 916, an umbilical, or any other suitable pipe for such applications.

FIGS. 2 and 3 illustrate subsea pipe sections 902 according to various embodiments of the present disclosure. The subsea pipe section 902 includes a hollow body 920. The hollow body 920 has an inner surface 922 and an outer surface 924, as shown. The inner surface 922 defines an interior 926 of the hollow body 920, through which a suitable material, such as a liquid or gas as discussed above, may flow. The hollow body 920 may in exemplary embodiments be generally cylindrical, having a circular or oval-shaped cross-sectional profile. Alternatively, the hollow body 920 may have any suitable shape, which may be constant or may vary. The hollow body 920 may extend along a longitudinal axis 928. It should be noted that the longitudinal direction 928 is a direction generally through the center of the hollow body 920, and may correspond for example to a flow direction through the hollow body 920. Thus, the longitudinal direction 928 may curve at any suitable angle as required based on the curvature of the hollow body 920.

The hollow body 920 may be formed from any suitable polymer material, which in exemplary embodiments may be a thermoplastic material (resin). For example, suitable thermoplastic polymers for use in the hollow body 920 may include, for instance, polyolefins (e.g., polypropylene, propylene-ethylene copolymers, etc.), polyesters (e.g., polybutylene terephalate ("PBT")), polycarbonates, polyamides (e.g., PA12, Nylon™), polyether ketones (e.g., polyether ether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

A hollow body 920 formed according to the present disclosure may be reinforced or unreinforced. A reinforced hollow body 920 may include a plurality of fibers dispersed in the polymer material forming the hollow body 920. The fibers may be long fibers or continuous fibers. As used therein, the term "long fibers" generally refers to fibers, filaments, yarns, or rovings that are not continuous, and as opposed to "continuous fibers" which generally refer to fibers, filaments, yarns, or rovings having a length that is generally limited only by the length of a part. The fibers dispersed in the polymer material to form the hollow body 920 may be formed from any conventional material known in the art, such as metal fibers, glass fibers (e.g., E-glass, A-glass, C-glass, D-glass, AR-glass, R-glass, S-glass such as S1-glass or S2-glass), carbon fibers (e.g., graphite), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing polymer compositions. Glass fibers and carbon fibers are particularly desirable.

A subsea pipe section 902 according to the present disclosure further includes one or more reinforcement layers 930. Each reinforcement layer 930 may generally surround the hollow body 920, and may be bonded to the hollow body 920 or another reinforcement layer 930. FIGS. 2 and 3 illustrate embodiments of a reinforcement layer 930 surrounding and bonded to the hollow body 920. A reinforcement layer 930 has an inner surface 932 and an outer surface 934. When the reinforcement layer 930 surrounds the hollow body 920, the inner surface 932 may contact the hollow body 920, such as the outer surface 924 thereof. The reinforcement layer 930 and, optionally, the hollow body 920 may be heated, and may be consolidated such that the reinforcement layer 930 and hollow body 920 are bonded together. Bonding of the reinforcement layer 930 with the hollow body 920 may advantageously reinforce the hollow body 920, as discussed herein.

As discussed in detail below, the reinforcement layer 930 may be formed from a fiber reinforced thermoplastic material, which may include any suitable fibers and any suitable thermoplastic resin as discussed above with respect to the hollow body 920. In some exemplary embodiments, for example, the thermoplastic resin may be polyether ether ketone ("PEEK"). Further, the fibers may be carbon fibers, which in exemplary embodiments may be continuous. This combination of thermoplastic resin and fibers may in some embodiments be particularly advantageous, such as in subsea applications involving relatively higher temperatures, such as above approximately 120° C. In other exemplary embodiments, for example, the thermoplastic resin may be a polyamide, such as PA12. Further, the fibers may be S-glass fibers, which in exemplary embodiments may be continuous. This combination of thermoplastic resin and fibers may in some embodiments be particularly advantageous, such as in subsea applications involving relatively lower temperatures, such as approximately 120° C. or less.

Further, the layer 930 and material forming the layer 930 may have one or more resin rich portions 302 and a fiber rich portion 304 (see FIGS. 2, 3, and 27 through 30), and thus be asymmetric. A first resin rich portion 302 may include the inner surface 932 of the reinforcement layer 930. Thus, when placed in contact with the hollow body 920, the first resin rich portion 302 may be proximate, and in contact with, the hollow body 920, such as the outer surface 924 thereof, and the fiber rich portion 304 may be spaced from the outer surface 924 of the hollow body 920 relative to the first resin rich portion 302. Such proximity of the first resin rich portion 302 may facilitate improved bonding of the reinforcement layer 930 with the hollow body 920. Because this portion 302 is resin rich, the resin may be relatively more efficiently heated to a temperature that allows consolidation and bonding with the hollow body 920. Better bonding thus results from the use of reinforcement layer 930 with a resin rich portion 302, which provides improved strength characteristics for the resulting subsea pipe section 902.

In some embodiments, as shown in FIGS. 2 and 27 through 28, the fiber rich portion 304 may include the outer surface 934. In these embodiments, the reinforcement layer 930 may include only one resin rich portion 302, and may thus be asymmetric. In other embodiments, as shown in FIGS. 3 and 29 through 30, the reinforcement layer 930 may further include a second resin rich portion 302. The second resin rich portion 302 may include the outer surface 934, and the fiber rich portion 304 may be disposed between the first resin rich portion and the second resin rich portion 302. The second resin rich portion 302 may facilitate improved bonding of the reinforcement layer 930 with, for example, a second reinforcement layer 930 as shown in FIG. 3 or any other suitable layer that is brought into contact with the reinforcement layer 930. Because this portion 302 is resin rich, the resin may be relatively more efficiently heated to a temperature that allows consolidation and bonding with this outer layer. Better bonding thus results from the use of reinforcement layer 930 with two opposing resin rich portions 302, which provides improved strength characteristics for the resulting subsea pipe section 902.

In exemplary embodiments as shown, a reinforcement layer 930 is a tape, such as a tape 152 or tape 156 as discussed below, formed from the fiber reinforced thermoplastic material. The tape may be wrapped around hollow body 920 to surround the hollow body 920. For example, in some exemplary embodiments as shown in FIGS. 2 and 3, the tape may be wrapped around the hollow body 920 generally helically with respect to the longitudinal axis 928 of the hollow body 920.

A tape according to the present disclosure may be formed using any suitable process or apparatus. Exemplary embodiments of suitable processes and apparatus for forming a tape that may be a reinforcement layer 930 according to the present disclosure are discussed in detail below.

Referring to FIG. 4, one embodiment of such an extrusion device is shown. More particularly, the apparatus includes an extruder 120 containing a screw shaft 124 mounted inside a barrel 122. A heater 130 (e.g., electrical resistance heater) is mounted outside the barrel 122. During use, a polymer feedstock 127 is supplied to the extruder 120 through a hopper 126. The feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The rovings 142 are generally positioned side-by-side, with minimal to no distance between neighboring rovings, before impregnation. The feedstock 127 may further be heated inside the die by heaters 133 mounted in or around the die 150. The die is generally operated at temperatures that are sufficient to cause and/or maintain the proper melt temperature for the polymer, thus allowing for the desired level of impregnation of the rovings by the polymer. Typically, the operation temperature of the die is higher than the melt temperature of the polymer, such as at temperatures from about 200° C. to about 450° C. When processed in this manner, the continuous fiber rovings 142 become embedded in the polymer matrix, which may be a resin 214 processed from the feedstock 127. The mixture may then exit the impregnation die 150 as wetted composite or extrudate 152.

As used herein, the term "roving" generally refers to a bundle of individual fibers 300. The fibers 300 contained within the roving can be twisted or can be straight. The rovings may contain a single fiber type or different types of fibers 300. Different fibers may also be contained in individual rovings or, alternatively, each roving may contain a different fiber type. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.05 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S-glass such as S1-glass or S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 9 to about 35 micrometers. The number of fibers contained in each roving can be constant or vary from roving to roving. Typically, a roving contains from about 1,000 fibers to about 50,000 individual fibers, and in some embodiments, from about 5,000 to about 30,000 fibers.

Any of a variety of thermoplastic or thermoset polymers may be employed to form the polymer matrix in which the continuous fibers are embedded. For example, suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., PA12, Nylon™), polyether ketones (e.g., polyether ether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

The properties of the polymer matrix are generally selected to achieve the desired combination of processability and performance. For example, the melt viscosity of the polymer matrix is generally low enough so that the polymer can adequately impregnate the fibers. In this regard, the melt viscosity typically ranges from about 25 to about 5,000 Pascal-seconds ("Pa-s"), in some embodiments about 25 to about 1,000 Pa-s, in some embodiments from 50 about 500 Pa-s, and in some embodiments, from about 60 to about 200 Pa-s, determined at the operating conditions used for the polymer (e.g., about 360° C.). Likewise, when the impregnated rovings are intended for applications involving high temperatures, a polymer is employed that has a relatively high melting temperature. For example, the melting temperature of such high temperature polymers may range from about 200° C. to about 500° C., in some embodiments from about 225° C. to about 400° C., and in some embodiments, from about 250° C. to about 350° C.

A pressure sensor 137 (FIGS. 5 through 7) may sense the pressure near the impregnation die 150 to allow control to be exerted over the rate of extrusion by controlling the rotational speed of the screw shaft 124, or the feed rate of the feeder. That is, the pressure sensor 137 is positioned near the impregnation die 150, such as upstream of the manifold assembly 220, so that the extruder 120 can be operated to deliver a correct amount of resin 214 for interaction with the fiber rovings 142. After leaving the impregnation die 150, impregnated rovings 142 or the extrudate or tape 152, which may comprises the fiber impregnated polymer material, may enter an optional pre-shaping or guiding section (not shown) and/or a preheating device to control the temperature of the extrudate before entering a nip formed between two adjacent rollers 190. Although optional, the rollers 190 can help to consolidate the impregnated rovings 142 into a tape 156 or consolidate the tape 152 into a final tape 156, as well as enhance fiber impregnation and squeeze out any excess voids. In addition to the rollers 190, other shaping devices may also be employed, such as a die system. Regardless, the resulting consolidated tape 156 is pulled by tracks 162 and 164 mounted on rollers. The tracks 162 and 164 also pull the impregnated rovings 142 or tape 152 from the impregnation die 150 and through the rollers 190. If desired, the consolidated tape 156 may be wound up at a section 171. Generally speaking, the resulting tapes are relatively thin and typically have a thickness of from about 0.05 to about 1 millimeter, in some embodiments from about 0.1 to about 0.8 millimeters, and in some embodiments, from about 0.1 to about 0.4 millimeters.

Perspective views of one embodiment of a die 150 according to the present disclosure are further shown in FIGS. 5, 6 and 7. As shown, resin 214 is flowed into the die 150 as indicated by resin flow direction 244. The resin 214 is distributed within the die 150 and then interacted with the rovings 142. The rovings 142 are traversed through the die 150 in roving run direction 282, and are coated with resin 214. The rovings 142 are then impregnated with the resin 214, and these impregnated rovings 142 exit the die 150. In some embodiments the impregnated rovings 142 are connected by the resin 214 and thus exist as tape 152. In other embodiments the impregnated ravings 142 exit the die separately, each impregnated within resin 214.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from tapes of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, pin, etc. The contact surfaces 252 are also typically made of a metal material.

FIGS. 8 and 9 show cross-sectional views of an impregnation die 150. As shown, the impregnation die 150 includes a manifold assembly 220 and an impregnation section. The impregnation section includes an impregnation zone 250. In some embodiments, the impregnation section additionally includes a gate passage 270. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

As shown in FIGS. 10 through 16, in exemplary embodiments, at least a portion of each of the channels 222 may be curvilinear. The curvilinear portions may allow for relatively smooth redirection of the resin 214 in various directions to distribute the resin 214 through the manifold assembly 220, and may allow for relatively smooth flow of the resin 214 through the channels 222. Alternatively, the channels 222 may be linear, and redirection of the resin 214 may be through relatively sharp transition areas between linear portions of the channels 222. It should further be understood that the channels 222 may have any suitable shape, size, and/or contour.

The plurality of channels 222 may, in exemplary embodiments as shown in FIGS. 10 through 16, be a plurality of branched runners 222. The runners 222 may include a first branched runner group 232. The first branched runner group 232 includes a plurality of runners 222 branching off from an initial channel or channels 222 that provide the resin 214 to the manifold assembly 220. The first branched runner group 232 may include 2, 3, 4 or more runners 222 branching off from the initial channels 222.

If desired, the runners 222 may include a second branched runner group 234 diverging from the first branched runner group 232, as shown in FIGS. 10 and 12 through 16. For example, a plurality of runners 222 from the second branched runner group 234 may branch off from one or more of the runners 222 in the first branched runner group 232. The second branched runner group 234 may include 2, 3, 4 or more runners 222 branching off from runners 222 in the first branched runner group 232.

If desired, the runners 222 may include a third branched runner group 236 diverging from the second branched runner group 234, as shown in FIGS. 10 and 13 through 14. For example, a plurality of runners 222 from the third branched runner group 236 may branch off from one or more of the runners 222 in the second branched runner group 234. The third branched runner group 236 may include 2, 3, 4 or more runners 222 branching off from runners 222 in the second branched runner group 234.

In some exemplary embodiments, as shown in FIGS. 10 through 16, the plurality of branched runners 222 have a symmetrical orientation along a central axis 224. The branched runners 222 and the symmetrical orientation thereof generally evenly distribute the resin 214, such that the flow of resin 214 exiting the manifold assembly 220 and coating the rovings 142 is substantially uniformly distributed on the rovings 142. This desirably allows for generally uniform impregnation of the rovings 142.

Further, the manifold assembly 220 may in some embodiments define an outlet region 242. The outlet region 242 is that portion of the manifold assembly 220 wherein resin 214 exits the manifold assembly 220. Thus, the outlet region 242 generally encompasses at least a downstream portion of the channels or runners 222 from which the resin 214 exits. In some embodiments, as shown in FIGS. 10 through 15, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142. Additionally or alternatively, various channels or runners 222 disposed in the outlet region 242 may have constant areas in the flow direction 244 of the resin 214, as shown in FIG. 16, or may have decreasing areas in the flow direction 244 of the resin 214.

In some embodiments, as shown in FIGS. 10 through 14, each of the channels or runners 222 disposed in the outlet region 242 is positioned such that resin 214 flowing therefrom is combined with resin 214 from other channels or runners 222 disposed in the outlet region 242. This combination of the resin 214 from the various channels or runners 222 disposed in the outlet region 242 produces a generally singular and uniformly distributed flow of resin 214 from the manifold assembly 220 to substantially uniformly coat the rovings 142. Alternatively, as shown in FIGS. 15 and 16, various of the channels or runners 222 disposed in the outlet region 242 may be positioned such that resin 214 flowing therefrom is discrete from the resin 214 from other channels or runners 222 disposed in the outlet region 242. In these embodiments, a plurality of discrete but generally evenly distributed resin flows 214 may be produced by the manifold assembly 220 for substantially uniformly coating the rovings 142.

As shown in FIGS. 8 and 9, at least a portion of the channels or runners 222 disposed in the outlet region 242 have curvilinear cross-sectional profiles. These curvilinear profiles allow for the resin 214 to be gradually directed from the channels or runners 222 generally downward towards the rovings 142. Alternatively, however, these channels or runners 222 may have any suitable cross-sectional profiles.

As further illustrated in FIGS. 8 through 10, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough.

In some embodiments, as shown in FIGS. 8 and 9, the gate passage 270 extends vertically between the manifold assembly 220 and the impregnation zone 250. Alternatively, however, the gate passage 270 may extend at any suitable angle between vertical and horizontal such that resin 214 is allowed to flow therethrough.

Further, as shown in FIGS. 8 and 9, in some embodiments at least a portion of the gate passage 270 has a decreasing cross-sectional profile in the flow direction 244 of the resin 214. This taper of at least a portion of the gate passage 270 may increase the flow rate of the resin 214 flowing therethrough before it contacts the rovings 142, which may allow the resin 214 to impinge on the rovings 142. Initial impingement of the rovings 142 by the resin 214 provides for further impregnation of the rovings, as discussed below. Further, tapering of at least a portion of the gate passage 270 may increase backpressure in the gate passage 270 and the manifold assembly 220, which may further provide more even, uniform distribution of the resin 214 to coat the rovings 142. Alternatively, the gate passage 270 may have an increasing or generally constant cross-sectional profile, as desired or required.

Upon exiting the manifold assembly 220 and the gate passage 270 of the die 150 as shown in FIGS. 8 and 9, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the ravings 142. Initial impingement on the ravings 142 provides for further impregnation of the rovings 142 with the resin 214. Impingement on the rovings 142 may be facilitated by the velocity of the resin 214 when it impacts the rovings 142, the proximity of the rovings 142 to the resin 214 when the resin exits the manifold assembly 220 or gate passage 270, or other various variables.

As shown in FIGS. 8 and 9, the coated rovings 142 are traversed in run direction 282 through impregnation zone 250. The impregnation zone 250 is in fluid communication with the manifold assembly 220, such as through the gate passage 270 disposed therebetween. The impregnation zone 250 is configured to impregnate the rovings 142 with the resin 214.

For example, as discussed above, in exemplary embodiments as shown in FIGS. 8 and 17 through 23, the impregnation zone 250 includes a plurality of contact surfaces 252. The rovings 142 are traversed over the contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIGS. 8 and 9, the impregnation zone 250 is defined between two spaced apart opposing impregnation plates 256 and 258, which may be included in the impregnation section. First plate 256 defines a first inner surface 257, while second plate 258 defines a second inner surface 259. The impregnation zone 250 is defined between the first plate 256 and the second plate 258. The contact surfaces 252 may be defined on or extend from both the first and second inner surfaces 257 and 259, or only one of the first and second inner surfaces 257 and 259.

In exemplary embodiments, as shown in FIGS. 8, 9, 18, and 20 through 23, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidal-type pathway, which enhances shear.

Angle 254 at which the rovings 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°.

As stated above, contact surfaces 252 typically possess a curvilinear surface, such as a curved lobe, pin, etc. In exemplary embodiments as shown, a plurality of peaks, which may form contact surfaces 252, and valleys are thus defined. Further, in many exemplary embodiments, the impregnation zone 250 has a waveform cross-sectional profile. In one exemplary embodiment as shown in FIGS. 8, 9, 18, and 23, the contact surfaces 252 are lobes that form portions of the waveform surfaces of both the first and second plates 256 and 258 and define the waveform cross-sectional profile. FIG. 17 illustrates the second plate 258 and the various contact surfaces thereon that form at least a portion of the impregnation zone 250 according to some of these embodiments.

In other embodiments, as shown in FIG. 19, the contact surfaces 252 are lobes that form portions of a waveform surface of only one of the first or second plate 256 or 258. In these embodiments, impingement occurs only on the contact surfaces 252 on the surface of the one plate. The other plate may generally be flat or otherwise shaped such that no interaction with the coated rovings occurs.

In other alternative embodiments, as shown in FIGS. 20 through 22, the impregnation zone 250 may include a plurality of pins (or rods) 260, each pin having a contact surface 252. The pins 260 may be static, as shown in FIGS. 20 and 21, freely rotational (not shown), or rotationally driven, as shown in FIG. 22. Further, the pins 260 may be mounted directly to the surface of the plates defining the impingement zone, as shown in FIG. 20, or may be spaced from the surface as shown in FIGS. 21 and 22. It should be noted that the pins 260 may be heated by heaters 133, or may be heated individually or otherwise as desired or required. Further, the pins 260 may be contained within the die 150, or may extend outwardly from the die 150 and not be fully encased therein.

In further alternative embodiments, the contact surfaces 252 and impregnation zone 250 may comprise any suitable shapes and/or structures for impregnating the ravings 142 with the resin 214 as desired or required.

As discussed, a roving 142 traversed through an impregnation zone 250 according to the present disclosure may become impregnated by resin 214, thus resulting in an impregnated roving 142, and optionally a tape 152 comprising at least one roving 142, exiting the impregnation zone 250, such as downstream of the contact surfaces 252 in the run direction 282. The impregnated ravings 142 and optional tape 152 exiting the impregnation zone 250 are thus formed from a fiber impregnated polymer material, as discussed above. At least one fiber roving 142 may be contained within a polymer resin 214, as discussed above, to form the fiber impregnated polymer material and resulting tape 152 or tape 156. Further, in exemplary embodiments of the present disclosure, such tape 152 may include a at least one resin rich portion 302 and a fiber rich portion 304.

As further shown in FIGS. 7 and 9, in some embodiments, a faceplate 290 may adjoin or be adjacent to the impregnation zone 250. The faceplate 290 may be positioned downstream of the impregnation zone 250 and, if included, the land zone 280, in the run direction 282. The faceplate 290 may contact other components of the die 150, such as the impregnation zone 250 or land zone 280, or may be spaced therefrom. Faceplate 290 is generally configured to meter excess resin 214 from the rovings 142. Thus, apertures in the faceplate 290, through which the ravings 142 traverse, may be sized such that when the rovings 142 are traversed therethrough, the size of the apertures causes excess resin 214 to be removed from the rovings 142. Further, traversal of impregnated rovings 142 through a faceplate 290 may facilitate the formation of first and second resin rich portions 302. For example, as the impregnated ravings 142 are traversed through apertures in the faceplate 290, the resin 214 surrounding each roving 142 may be generally evenly distributed around each roving 142. When the rovings 142 are then consolidated into a tape 156, the evenly distributed resin 214 surrounding the rovings 142 may become the first and second resin rich portions 302.

As shown in FIGS. 6 and 8, in alternative embodiments, the die 150 may lack a faceplate 290. Further, in some embodiments, the formation and maintenance of a tape 152 within and exited from a die 150 of the present disclosure may be facilitated through the lack of or removal of a faceplate from the die 150. Removal of the faceplate 290 allows for a plurality of rovings 142 exiting a die 150 to exit as a single sheet or tape 152, rather than as separated rovings 142 due to metering through the faceplate. This could potentially eliminate the need to later form these ravings 142 into such a sheet or tape 156. Removal of the faceplate 290 may have additional advantages. For example, removal may prevent clogging of the faceplate with resin 214, which can disrupt the traversal of rovings 142 therethrough. Additionally, removal may allow for easier access to the impregnation zone 250, and may thus make it easier to introduce and reintroduce rovings 142 to the impregnation zone 250 during start-up, after temporary disruptions such as due to breakage of a roving 142, or during any other suitable time period.

FIGS. 2, 8, 23, 27, and 28 illustrate embodiments of an asymmetric tape 152 according to the present disclosure. As discussed, such tape 152, 156 may include a single resin rich portion 302 and a fiber rich portion 304. In some embodiments, the tape 152, 156 consists solely of the resin rich portion 302 and fiber rich portion 304. These portions may in some embodiments be defined as respective halves of a tape 152, 156, such as when viewed as a cross-section. For example, a tape 152, 156 may have a maximum height 306 (which may be a first major diameter) and a maximum width 308 (which may be a second perpendicular or minor diameter). The height 306 may be defined for the tape 152, 156 when in the impregnation zone 250 from the portion of the ravings 142 contained in the tape 152, 156 that contact a final contact surface 310. This final contact surface 310 may be the farthest downstream contact surface 252 in the run direction 282, such that it is the final point of contact in the impregnation zone 250 for the ravings 142. In some embodiments, the resin rich portion 302 may include that portion of the tape 152, 156 within one-half of the height 306 throughout all of the width 308, and the fiber rich portion 304 may include that portion of the tape 152, 156 within the other one-half of the height 306 throughout all of the width 308. In exemplary embodiments, for example, the resin rich portion 302 includes the one-half that is distal from the final contact surface 310, and thus includes a distal half of the cross-sectional area with respect to that final contact surface 310. In these embodiments, the fiber rich portion 304 includes the one-half that is proximal to the final contact surface 310 (and includes that portion that contacts the final contact surface 310), and thus includes a proximal half of the cross-sectional area with respect to that final contact surface 310.

In other embodiments, the resin rich portion 302 and fiber rich portion 304 may be viewed as more or less than half of a tape 152 as discussed above. For example, a resin rich portion 302 may be less than half of the tape 152, such as less than or equal to approximately 5%, 10%, 20%, 30%, or 40% of the height 305 throughout the width 308. A fiber rich portion 302 may be greater than or equal to approximately 95%, 90%, 80%, 70%, or 60% of the height 305 throughout the width 308.

FIGS. 3, 9, 29, and 30 illustrate embodiments of an tape 156 having opposing resin rich portions 302 according to the present disclosure. As discussed, such tape 152 may include a first resin rich portion 302, a second resin rich portion 302, and a fiber rich portion 304 disposed between the resin rich portions 302. In some embodiments, the tape 152 consists solely of the resin rich portions 302 and fiber rich portion 304. These portions may in some embodiments be defined as respective thirds of a tape 152, such as when viewed as a cross-section. For example, each resin rich portion 302 may include that portion of the tape 156 within one-third of the height 306 throughout all of the width 308.

In other embodiments, the resin rich portions 302 and fiber rich portion 304 may be viewed as more or less than a third of a tape 156 as discussed above. For example, a resin rich portion 302 may be less than third of the tape 152, such as less than or equal to approximately 5%, 10%, 20%, or 30% of the height 306 throughout the width 308. A fiber rich portion 302 may be greater than or equal to approximately 95%, 90%, 80%, 70%, 60%, 50%, or 40% of the height 306 throughout the width 308.

A resin rich portion 302 according to the present disclosure may include relatively more resin 214 than fibers 300, while a fiber rich portion 304 may include relatively more fibers 300 than resin 214. In some embodiments, such ratio may be calculated on a per volume basis for a tape 152, 156, or on a per surface area basis for a cross-section of a tape 152, 156. In these embodiments, such ratio may further be calculated as an average throughout all or a portion of a tape 152, 156, such as throughout all or a portion of the length of a tape 152, 156 using the volume thereof or using a plurality of cross-sections.

For example, a resin rich portion 302 in some embodiments may include at least approximately 60%, 65%, 70%, 75%, 80%, 85%, or any other suitable percentage, range, or subrange thereof of the total amount of resin 214. The total amount may include the amount in both the resin rich portions 302 and the fiber rich portion 304. In other embodiments, the ratio of resin 214 to fibers 300 in the resin rich portion 302 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 152, 156.

Further, the fiber rich portion 304 in some embodiments may include at least approximately 60%, 65%, 70%, 75%, 80%, 85%, or any other suitable percentage, range, or sub-range thereof of the total amount of fiber 300. The total amount may include the amount in both the resin rich portions 302 and the fiber rich portion 304. In other embodiments, the ratio of fiber 300 to resin 214 in the fiber rich portion 304 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 152, 156.

Additionally or alternatively, a resin rich portion 302 in some embodiments may include a percentage resin 214 (as opposed to fibers 300 contained in the resin rich portion 302) of at least approximately 75%, 80%, 85%, 90%, 95%, 100% or any other suitable percentage, range, or sub-range thereof. Such percentage may be calculated on a per volume basis or a per surface area basis for a cross-sectional area of a tape 152, 156.

Microscopy may in some embodiments be particularly useful in determining the existence of resin rich portions 302 and fiber rich portions 304. A microscopy image of one embodiment of an asymmetric tape 156 having one resin rich portion 302 and a fiber rich portion 304 is shown in FIG. 28. A microscopy image of one embodiment of a tape 156 having opposing resin rich portions 302 and a fiber rich portion 304 is shown in FIG. 30. A cross-section of a tape 156 can be analyzed using microscopy to determine the existence of resin rich portions 302 and a fiber rich portion 304. Such method is particularly useful in embodiments wherein a resin rich portion 302 is less than half or a third of the tape 152, 156, such as less than or equal to approximately 5%, 10%, 20% of the height 306, and further is relatively devoid of fibers 300, such as containing a percentage resin 214 (as opposed to fibers 300 contained in the resin rich portion 302) of at least approximately 75%, 80%, 85%, 90%, 95%, or 100%.

It should be understood that a tape 152, 156 according to the present disclosure may have any suitable cross-sectional shape and/or size. For example, such tape 152, 156 may have a generally rectangular shape, or a generally oval or circular or other suitable polygonal or otherwise shape. Further, it should be understood that one or more impregnated rovings 142 having been traversed through the impregnation zone 250 may together form the tape 152, 156, with the resin 214 of the various rovings 142 connected to form such tape 152, 156. The various above amounts, ranges, and/or ratios may thus in exemplary embodiments be determined for a tape 152 having any suitable number of impregnated rovings 142 embedded and generally dispersed within resin 214.

As shown in, for example, FIGS. 8 and 23, an impregnated roving 142 and/or tape 152 may be formed through contact of the rovings 142 with the plurality of contact surfaces 252 in the impregnation zone 250. In some embodiments, contact with the final contact surface 310 may form an asymmetric tape 152 and single resin rich portion 302 and fiber rich portion 304 thereof. Contact of the tape 152, including resin 214 and fibers 300 therein, with the final contact surface 310 may remove resin 214 from the portion of the tape 152 and rovings 142 therein that contacts the contact surface 310, thus removing such resin 214 from the fiber rich portion 304, while impregnating the rovings 142 therein and allowing resin 214 to remain in the resin rich portion 302. Such contact to form the resin rich portion 302 and fiber rich portion 304 may in some embodiments be further facilitated by removal or lack of a faceplate, which allows for the rovings 142 to traverse the final contact surface 310 at a suitable and desirable angle, as discussed herein, and further allows for the resin 214 surrounding the rovings 142 to be connected such that the tape 152 is formed when the fiber impregnated polymer material exits the impregnation zone 250. In other embodiments, such as in embodiments wherein a faceplate 290 is included, traversal and metering through the faceplate 290 and further processing of the impregnated rovings 142 may form a tape 156 and opposing resin rich portions 302 and fiber rich portion 304 thereof.

As mentioned, in some embodiments no metering of an impregnated roving 142 according to the present disclosure, such as through a faceplate or otherwise, may occur in the die 150 after contact with the plurality of contact surfaces 252. In particular, no metering may occur after contact with the final contact surface 310. Thus, impregnated rovings 142 exiting the impregnation zone 250 may form a tape 152. In other embodiments, metering occurs, such that the impregnated rovings 142 are separated when exiting the faceplate 290. Further, in some embodiments, the system of the present disclosure may further include a roller 190. The roller 190 may be positioned downstream of the die 150, and may be provided in the system for rolling impregnated rovings 142 and/or tape 152 therethrough, as discussed above. In some embodiments, no metering of impregnated rovings 142 may occur between contact with the plurality of contact surfaces 252 by an impregnated roving 142 and contact with the roller 190 by an impregnated roving 142. In other embodiments, however, metering may occur in and/or downstream of the die 150. Such metering may be performed by a faceplate 290 as discussed above.

To further facilitate impregnation of the rovings 142, they may also be kept under tension while present within the die 150, and specifically within the impregnation zone 250. The tension may, for example, range from about 5 to about 300 Newtons, in some embodiments from about 50 to about 250 Newtons, and in some embodiments, from about 100 to about 200 Newtons per roving 142 or tow of fibers.

As shown in FIGS. 8, 9, 24 and 25, in some embodiments, a land zone 280 may be positioned downstream of the impregnation zone 250 in run direction 282 of the rovings 142. The rovings 142 may traverse through the land zone 280 before exiting the die 150. In some embodiments, as shown in FIG. 24, at least a portion of the land zone 280 may have an increasing cross-sectional profile in run direction 282, such that the area of the land zone 280 increases. The increasing portion may be the downstream portion of the land zone 280 to facilitate the rovings 142 exiting the die 150. Alternatively, the cross-sectional profile or any portion thereof may decrease, or may remain constant as shown in FIG. 25.

Additionally, other components may be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across exit ports. The spread rovings may then be introduced into a die for impregnation, such as described above.

It should be understood that tapes 152, 156 and impregnated rovings 142 thereof according to the present disclosure need not be formed in the dies 150 and other apparatus as discussed above. Such dies 150 and apparatus are merely disclosed as examples of suitable equipment for forming tapes 152, 156 and rovings 142. The use of any suitable equipment or process to form tapes 152, 156 and rovings 142 is within the scope and spirit of the present disclosure.

The tapes 152 that result from use of the die and method according to the present disclosure may have a very low void fraction, which helps enhance their strength. For instance, the void fraction may be about 3% or less, in some embodiments about 2% or less, in some embodiments about 1.5% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polymer matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);

$\rho_f$ is the density of the fibers;

$W_f$ is the weight fraction of the fibers; and $W_m$ is the weight fraction of the polymer matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the polymer, fibers, and tape in accordance with ASTM D 2734-09 (Method A), where the densities may be determined ASTM D792-08 Method A. Of course, the void fraction can also be estimated using conventional microscopy equipment.

As discussed above, after exiting the impregnation die 150, the impregnated rovings 142 may in some embodiments form a tape 152. The impregnated rovings 142 and/or tape 152 may be consolidated into a consolidated tape 156. The number of rovings employed in each tape 152, 156 may vary. Typically, however, a tape 152, 156 will contain from 2 to 80 rovings, and in some embodiments from 10 to 60 rovings, and in some embodiments, from 20 to 50 rovings. In some embodiments, it may be desired that the rovings are spaced apart approximately the same distance from each other within the tape 152. In other embodiments, however, it may be desired that the rovings are combined, such that the fibers of the rovings are generally evenly distributed throughout the tape 152, such as throughout one or more resin rich portions and a fiber rich portion as discussed above. In these embodiments, the rovings may be generally indistinguishable from each other. Referring to FIGS. 26 through 30, for example, embodiments of a tape 156 are shown that contains rovings that are combined such that the fibers are generally evenly distributed within a fiber rich portion thereof. FIGS. 27 and 28 show embodiments of an asymmetric tape 156 having a single resin rich portion 302 and a fiber rich portion 304, FIGS. 29 and 30 show embodiments of a tape 156 having opposing resin rich portions 302 and a fiber rich portion 304 disposed therebetween.

A relatively high percentage of fibers may be employed in a tape, and fiber reinforced thermoplastic material thereof, to provide enhanced strength properties. For instance, fibers typically constitute from about 25 wt. % to about 90 wt. %, in some embodiments from about 30 wt. % to about 75 wt. %, and in some embodiments, from about 35 wt. % to about 70 wt. % of the tape or material thereof. Likewise, polymer(s) typically constitute from about 20 wt. % to about 75 wt. %, in some embodiments from about 25 wt. % to about 70 wt. %, and in some embodiments, from about 30 wt. % to about 65 wt. % of the tape 152, 156. Such percentage of fibers may additionally or alternatively by measured as a volume fraction. For example, in some embodiments, the fiber reinforced thermoplastic material may have a fiber volume fraction between approximately 25% and approximately 80%, in some embodiments between approximately 30% and approximately 70%, in some embodiments between approximately 40% and approximately 60%, and in some embodiments between approximately 45% and approximately 55%.

Tapes 152, 156, and reinforcement layers 930 formed according to the present disclosure have a variety of advantageous characteristics. Notably, as discussed above, a resin rich portion 302 of a reinforcement layer 930 allows more efficient and stronger bonding with a hollow body 920 of a subsea pipe section 902, thus providing improved reinforcement of the subsea pipe section 902. The formation of resin rich portions 302 is particularly advantageous in embodiments wherein the tape 152, 156 has a relatively high fiber-to-resin ratio, due to the relatively low amount of resin available for bonding, such as in tapes with fiber volume fractions greater than or equal to approximately 50%, such as greater than or equal to approximately 60%. The formation of resin rich portions 302 positions the resin to facilitate improved bonding with hollow bodies 920. Further, forming of tapes 152, 156 and reinforcement layers 930 as discussed above, and in particular in dies 150 without faceplates, advantageously allows for the thickness and fiber areal weight to be controlled. For example, the roving count in a tape can be adjusted one or more rovings at a time to obtain a desired fiber areal weight and thickness. Control of these characteristics is particularly important in subsea pipe applications in order to allow the pipe sections 902 to maintain suitable flexibility for, for example, winding thereof.

Further, oxidation of various additives included in a fiber reinforced thermoplastic material formed according to the present disclosure may be advantageously identified due to discoloration of the resin rich portions 302 or fiber rich portion 304. Such identification may allow for removal of these portions of the material, such that these portions are not used in forming subsea pipe sections 902.

The present disclosure is further directed to methods for forming subsea pipe sections 902. A method may include, for example, surrounding a hollow body 920 with a reinforcement layer 930. The reinforcement layer 930 may have one or more resin rich portions 302 and a fiber rich portion 304 as discussed above. A first resin rich portion 302 may be in contact with the hollow body 920, such as with an outer surface 924 thereof.

In some embodiments, the surrounding step includes wrapping the reinforcement layer 930 around the hollow body 920, such as generally helically with respect to a longitudinal axis 928 of the hollow body 920. Further, in some embodiments, the reinforcement layer 930 is a tape 152, 156 formed from the fiber reinforced thermoplastic material, as discussed above.

The method may further include heating the reinforcement layer 930 and, optionally, the hollow body 920, to consolidation temperatures. Heating may be performed in a die 150 or otherwise during formation of the reinforcement layer 930 or tape thereof, or may be separately performed. A suitable heating source may be, for example, infrared, hot gas, laser, or otherwise. A consolidation temperature is a temperature that allows the reinforcement layer 930 and hollow body 930 to consolidate and thus be bonded together. For example, the consolidation temperature for a particular polymer resin may be the melting point temperature, or a temperature between approximately 20° C., 15° C., 10° C., or 5° C. below the melting point temperature and the melting point temperature for that polymer resin. The method may further include consolidating the hollow body 920 and the reinforcement layer 930. Consolidation may involve, for example, pressing the hollow body 920 and reinforcement layer 930 together, or simply allowing the hollow body 920 and reinforcement layer 930 to remain in contact, after heating thereof. The method may further include cooling the resulting subsea pipe section 902 after consolidation, and thus bonding, of the hollow body 920 and reinforcement layer 930.

In some embodiments, and in particular when the reinforcement layer 930 includes opposing resin rich portions 302, the method may further include surrounding the reinforcement layer with a second reinforcement layer 930, and heating and consolidating these layers as disclosed herein with respect to the reinforcement layer 930 and hollow body 920.

In some embodiments, the method may further include forming the reinforcement layer 930, such as the tape 152, 156 that forms the reinforcement layer 930. Such forming may include, for example, flowing a polymer resin 214 through a manifold assembly 220. The manifold assembly 220 may include a plurality of channels or branched runners 222, as discussed above. The forming step may further includes coating the fiber rovings 142 with the resin 214, as discussed above. Further, the forming step may include traversing the coated roving 142 through an impregnation zone 250 to impregnate the rovings 142 with the resin 214, as discussed above. Such traversing step may include contacting a plurality of contact surfaces 252, which includes a final contact surface 310, as discussed above.

As discussed above, in some embodiments, the step of flowing the resin 214 through the manifold assembly 220 may include flowing the resin 214 through an outlet region 242 of the manifold assembly 220. As further discussed above, the step of coating the roving 142 with the resin 214 may include flowing the resin 214 from the manifold assembly 220 through a gate passage 270. The method may further include traversing the rovings 142 from the impregnation zone 250 through a land zone 280, as discussed above.

In some embodiments, as discussed above, tapes 152, 156 including impregnated rovings 142 exiting the die 150 may include a single resin rich portion 302 and a fiber rich portion 304. In other embodiments, as discussed above, tapes 156 that result from impregnation as discussed above include opposing resin rich portions 302 and a fiber rich portion 304 disposed therebetween.

As discussed, in some embodiments, no metering of an impregnated roving 142 occurs in the die 150 after impregnation, such as after contact with the plurality of contact surfaces 252. In other embodiments, metering may occur, such as through faceplate 290. Additionally, in some embodiments, the method according to the present disclosure may further include rolling an impregnated roving 142 through a roller 190, as discussed above. In some embodiments, as discussed above, no metering of the impregnated rovings 142 may occur between the traversing step and the rolling step. In other embodiments, however, metering may occur as discussed above.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A subsea pipe section, comprising:
a hollow body formed from a polymer material, the hollow body having an inner surface and an outer surface, the inner surface defining an interior;
a reinforcement layer surrounding and bonded to the hollow body, the reinforcement layer having an inner surface and an outer surface, the reinforcement layer formed from a fiber reinforced thermoplastic material and having a resin rich portion and a fiber rich portion, the resin rich portion comprising the inner surface of the reinforcement layer and in contact with the hollow body, the fiber rich portion spaced from the inner surface of the reinforcement layer, wherein the resin rich comprises at least 75% resin by volume.

2. The subsea pipe section of claim 1, wherein the resin rich portion comprises at least 95% resin by volume.

3. The subsea pipe section of claim 1 wherein the resin rich portion is a first resin rich portion, and wherein the reinforcement layer further comprises a second resin rich portion, the second resin rich portion comprising the outer surface of the reinforcement layer, the fiber rich portion disposed between the first resin rich portion and the second resin rich portion.

4. The subsea pipe section of claim 1, wherein the fiber rich portion comprises the outer surface of the reinforcement layer.

5. The subsea pipe section of claim 1, wherein the fiber reinforced thermoplastic material has a fiber volume fraction of between approximately 30% and approximately 70%.

6. The subsea pipe section of claim 1, wherein the fiber reinforced thermoplastic material has a void fraction of approximately 2% or less.

7. The subsea pipe section of claim 1, wherein the thermoplastic resin of the fiber reinforced thermoplastic material is polyether ether ketone.

8. The subsea pipe section of claim 1, wherein the fibers of the fiber reinforced thermoplastic material are carbon fibers.

9. The subsea pipe section of claim 1, wherein the thermoplastic resin of the fiber reinforced thermoplastic material is a polyamide.

10. The subsea pipe section of claim 1, wherein the fibers of the fiber reinforced thermoplastic material are one of S-glass fibers or E-glass fibers.

11. The subsea pipe section of claim 1, wherein the reinforcement layer is a tape formed from the fiber reinforced thermoplastic material.

12. The subsea pipe section of claim 1, wherein the reinforcement layer is wrapped generally helically around the hollow body with respect to a longitudinal axis of the hollow body.

13. The subsea pipe section of claim 1, wherein the hollow body is a riser pipe body.

14. A subsea pipe section, comprising:
a hollow body formed from a polymer material, the hollow body having an inner surface and an outer surface, the inner surface defining an interior;
a reinforcement layer surrounding and bonded to the hollow body, the reinforcement layer having an inner surface and an outer surface, the reinforcement layer formed from a fiber reinforced thermoplastic material and having a resin rich portion and a fiber rich portion, the resin rich portion comprising the inner surface of the reinforcement layer and in contact with the hollow body, the fiber rich portion spaced from the inner surface of the reinforcement layer, wherein the fiber reinforced thermoplastic material has a void fraction of approximately 2% or less.

15. The subsea pipe section of claim 14, wherein the resin rich portion is a first resin rich portion, and wherein the reinforcement layer further comprises a second resin rich portion, the second resin rich portion comprising the outer surface of the reinforcement layer, the fiber rich portion disposed between the first resin rich portion and the second resin rich portion.

16. The subsea pipe section of claim 14, wherein the fiber rich portion comprises the outer surface of the reinforcement layer.

17. The subsea pipe section of claim 14, wherein the fiber reinforced thermoplastic material has a fiber volume fraction of between approximately 30% and approximately 70%.

18. The subsea pipe section of claim 14, wherein the reinforcement layer is a tape formed from the fiber reinforced thermoplastic material.

19. The subsea pipe section of claim 14, wherein the reinforcement layer is wrapped generally helically around the hollow body with respect to a longitudinal axis of the hollow body.

20. The subsea pipe section of claim 14, wherein the hollow body is a riser pipe body.

21. A subsea pipe section, comprising:
a hollow body formed from a polymer material, the hollow body having an inner surface and an outer surface, the inner surface defining an interior;
a reinforcement layer surrounding and bonded to the hollow body, the reinforcement layer having an inner surface and an outer surface, the reinforcement layer formed from a fiber reinforced thermoplastic material and having a resin rich portion and a fiber rich portion, the resin rich portion comprising the inner surface of the reinforcement layer and in contact with the hollow body, the fiber rich portion spaced from the inner surface of the reinforcement layer,
wherein the fibers of the fiber reinforced thermoplastic material are carbon fibers.

22. The subsea pipe section of claim 21, wherein the resin rich portion is a first resin rich portion, and wherein the reinforcement layer further comprises a second resin rich portion, the second resin rich portion comprising the outer surface of the reinforcement layer, the fiber rich portion disposed between the first resin rich portion and the second resin rich portion.

23. The subsea pipe section of claim 21, wherein the fiber rich portion comprises the outer surface of the reinforcement layer.

24. The subsea pipe section of claim 21, wherein the fiber reinforced thermoplastic material has a fiber volume fraction of between approximately 30% and approximately 70%.

25. The subsea pipe section of claim 21, wherein the reinforcement layer is a tape formed from the Opel reinforced thermoplastic material.

26. The subsea pipe section of claim 21, wherein the reinforcement layer is wrapped generally helically around the hollow body with respect to a longitudinal axis of the hollow body.

27. The subsea pipe section of claim 21, wherein the hollow body is a riser pipe body.

* * * * *